US006531537B2

(12) United States Patent
Friel et al.

(10) Patent No.: US 6,531,537 B2
(45) Date of Patent: Mar. 11, 2003

(54) PREPAINTS AND METHODS OF PREPARING PAINTS FROM THE PREPAINTS

(76) Inventors: John Michael Friel, 341 Beech St., Warminster, PA (US) 18974; John William Hook, III, 410 Twin Streams Dr., Warminster, PA (US) 18974; Bernhard Helmut Lieser, 818 S. Patton Ave., San Pedro, CA (US) 90731; Jerry William Washel, 594 Quarry Rd., Harleysville, PA (US) 19438; Dennis Paul Lorah, 1692 Heebner Way, Lansdale, PA (US) 19446; Joseph Michael Beno, Jr., 6239 Greenhill Rd., New Hope, PA (US) 18938; Irene May Melly, 1204 St. Clair Rd., Oreland, PA (US) 19075

( * ) Notice: Subject to any disclaimer, the term of this patent is extended or adjusted under 35 U.S.C. 154(b) by 0 days.

(21) Appl. No.: 09/785,152

(22) Filed: Feb. 16, 2001

(65) Prior Publication Data
US 2002/0013401 A1 Jan. 31, 2002

Related U.S. Application Data

(60) Provisional application No. 60/183,655, filed on Feb. 18, 2000, provisional application No. 60/183,656, filed on Feb. 18, 2000, and provisional application No. 60/247,639, filed on Nov. 10, 2000.

(51) Int. Cl.[7] .............................. C08K 3/22; C08K 3/18; C08K 5/09; C08K 5/10
(52) U.S. Cl. ................. 524/497; 524/430; 524/432; 524/247; 524/284; 524/417; 524/445; 524/493
(58) Field of Search .............................. 524/497, 430, 524/432, 297, 284, 417, 445, 493

(56) References Cited

U.S. PATENT DOCUMENTS

| | | | |
|---|---|---|---|
| 4,243,430 A | 1/1981 | Sperry et al. | 106/308 |
| 4,403,866 A | 9/1983 | Falcoff et al. | 366/138 |
| 4,436,845 A | 3/1984 | Kitano | 523/172 |
| 5,078,302 A | 1/1992 | Hellenberg | 222/144 |
| 5,129,551 A | 7/1992 | Gott | 222/135 |
| 5,521,234 A | 5/1996 | Brown et al. | 524/44 |
| 5,527,853 A | 6/1996 | Landy et al. | 524/521 |
| 5,672,649 A | 9/1997 | Brock et al. | 524/507 |
| 5,823,670 A | 10/1998 | Rushing et al. | 366/152.1 |
| 5,842,641 A | 12/1998 | Mazzalveri | 239/104 |
| 5,922,398 A | 7/1999 | Hermes et al. | 427/137 |
| 6,013,721 A | 1/2000 | Schall et al. | 524/555 |
| 6,221,145 B1 | 4/2001 | McClain | 106/443 |
| 6,308,499 B1 | 10/2001 | Takada et al. | 53/415 |
| 2002/0007867 A1 | 1/2002 | Takada et al. | 141/94 |

FOREIGN PATENT DOCUMENTS

| | | |
|---|---|---|
| CA | 935 255 | 10/1973 |
| DE | 39 10 472 | 10/1990 |
| DE | 197 14 577 | 10/1998 |
| EP | 0 614 951 | 9/1994 |
| EP | 0 706 543 B1 | 4/1996 |
| EP | 1 094 096 | 4/2001 |
| IE | 940666 | 8/1994 |
| IT | PS98A000005 | 2/1998 |
| IT | PS98A000005 | 8/1999 |
| WO | WO 94/25238 | 11/1994 |
| WO | WO 95/29960 | 11/1995 |
| WO | WO 98/05417 | 2/1998 |
| WO | WO 00/37568 | 6/2000 |
| WO | WO 00/44834 | 8/2000 |

OTHER PUBLICATIONS

Patton, "Latex Critical Pigment Volume Concentration (LCPVC)", *Paint Flow and Pigment Dispersion*, 1979, p. 193.
Forsius, "Paint Production by Component Mixing", *Faerg Lack Scand.*, 1997, 43(2), 5–6.
Dutheillet, "Integrated Solution to Build Batch Processing Plants for Blending & Formulation Industries", *Chemical Engineering World*, 1997 32(5), 37–44.
Orcun, et al., "Scheduling of Batch Processes: An Industrial Application In Paint Industry", *Computers Chem. Enng.*, 1997, 21, S673–S678.
"Component Mixing—A New Approach to Customized Paint Production", *High Technology Finland*, 2000, 156–157.
Helander, "Benefits of delayed product differentiation", *Reprinted from PPCJ*, 1999.
Helander, "Impact of Form Postponement on Channel Members' Performance in Paint Business: A Theoretical Approach", *LTA*, 1999, p. 225–237.

*Primary Examiner*—Kriellion A. Sanders
(74) *Attorney, Agent, or Firm*—Howard R. Jaeger

(57) ABSTRACT

Methods of providing a paint line containing a latex polymeric binder are described. A range of paints can be formulated using sets of prepaints, at least one of which contains a latex polymeric binder. The paints may be applied as architectural coatings, industrial coatings, graphic arts coating, elastomeric coatings, and non-cementitious, aggregate finish coatings suitable for application on a wall directly or as a topcoat in exterior insulation finishing systems.

50 Claims, No Drawings

PREPAINTS AND METHODS OF PREPARING PAINTS FROM THE PREPAINTS

CROSS REFERENCE TO RELATED APPLICATIONS

This application claims priority to U.S. Provisional Applications Ser. No. 60/183,655 filed Feb. 18, 2000, No. 60/183,656 filed Feb. 18, 2000 and No. 60/247,639 filed Nov. 10, 2000.

BACKGROUND OF THE INVENTION

1. Field of the Invention

This invention relates to sets of prepaints methods of formulating paint lines using its sets of prepaints, useful paints, including as architectural coatings, industrial coatings, graphic art coatings, elastomeric coatings and non-cementitious, aggregate finish coatings, from sets of prepaint compositions.

2. Description of Related Art

For decades, professional painters/contractors and do-it-yourself consumers have been able to purchase paints that are tinted at the point-of-sale rather than at the manufacturing facility. This postponement of product differentiation permits the buyer to specify the desired color of the paint from a wide variety of choices rather than a limited number of colors once produced by the paint manufacturer.

While not practiced commercially, it is also theoretically known in the paint industry to postpone product differentiation of the paint components themselves as long as possible in the paint manufacturing process. See, for example, Carola Grundfelt-Forsius' paper in *Faerg Lack Scand* 43(2), pages 5–6 (1997) which describes the use of intermediaries or components, i. e., mixtures of several of the paint raw material ingredients, that are mixed together with the tinting pastes to yield different types of paints. Grundfelt-Forsius provides an example of such a system employing a polyurethane binder for a solution polymer system.

The methods of postponement of product differentiation offers the buyer the flexibility of selecting the desired final paints, whether it be the color of the paint or the type of paint while at the same time permitting the paint manufacturer or seller (retail or wholesale or distributor) to minimize inventories of raw materials, intermediates and final products as well as stock outages.

Despite these benefits, paint manufacturers have only been able to successfully employ the postponement in product differentiation to paint systems based on solution polymers. Paint manufacturers have not been successful in postponing product differentiation of paint components in latex polymer-based paint systems. Since the majority of paints used today are based on latex polymers, there is a need for a practical method for postponing product differentiation in a latex polymer-based paint system.

It is considerably more difficult to formulate a stable paint when using latex emulsion polymers rather than solution polymers because of latex instability. Emulsion polymers are very sensitive to the solvents and surface active agents commonly found in paint formulations, such as surfactants, dispersants, rheology modifiers, and co-solvents. Solution polymers are by definition soluble in the solvent they are supplied in, and there is no thermodynamic driving force causing the polymer molecules to agglomerate or become unstable. In contrast, latex polymers contain the polymeric material in particles that are insoluble in water. These particles require considerable surface modifications to render them stable when supplied in an aqueous medium. If the surface modification is inadequate, the latex particles attach to one another forming a coagulated mass which then separates out of the latex paint. Paint formulating with a latex system is very difficult because the surface active materials in the formulation disrupt the delicate balance of surface forces that stabilize the latex particles in a water medium.

The difference between latex polymer systems (also referred to herein as "emulsion") and solution polymer systems is further explained in Temple C. Patton's book entitled *Paint Flow and Pigment Dispersion* (New York: John Wiley and Sons, Inc., 1979, pages 192–193). Here the author describes the drying processes for the two systems. The main difference lies in the time required for each polymer to reach an irreversible state. Latex polymers reach this state much faster than solution polymers and thus make paints based on latex polymers more difficult to stabilize than paints based on solution polymers. In discussing "solvent-type coatings", (which contain solution polymers) the author writes " . . . the liquid vehicle flows rather than deforms around the pigment particles on drying. This flow assists the compaction process as the film shrinks because of loss of volatile solvent. Although the vehicle becomes more viscous as solvent evaporates, flow persists through most of the drying cycle." As the author paints out, the solution polymer is able to flow though most of the drying cycle as the solvent evaporates. This is not time for polymer emulsion. The same author notes: " . . . there is a preliminary flow of the latex suspension. This takes place before the time when the latex particles are first forced to come into intimate contact because of initial water loss. However, after this relatively short but very important initial flow, pigment compaction to achieve a high critical pigment volume concentration (CPVC) is achieved mainly by plastic deformation and coalescence of the latex particles." Coalescence is the irreversible contact between latex particles. Such irreversible contact can occur in a liquid paint based on latex polymers, but not in a liquid paint based on solution polymers. Thus, paints based on latex polymers are more difficult to formulate.

There is a great need to develop a set of prepaints and a method of formulating paints based on latex polymers using sets of prepaints.

Paint formulating involves the process of selecting and admixing appropriate paint ingredients in the correct proportions to provide a paint with specific processing and handling properties, as well as a final dry paint film with the desired properties. The major ingredients of latex paint formulations are a binder, an opacifying pigment, optional pigment extenders, and water. Common optional additives include defoamers, coalescents, plasticizers, thickeners, non-thickening rheology modifiers, opacifying agents, driers, anti-skinning agents, surfactants, mildewcides, biocides and dispersants. After the latex paint is formulated and applied to a surface, the paint dries by evaporation of the water, with or without the application of heat, and the binder forms a film containing therein the pigment and the pigment extender particles, if any.

Formulating paints is complex—it is not simply a matter of mixing a few paint ingredients in different ratios. Rather, it involves the selection and mixing of different paint ingredients in different ratios depending on the type of paint desired. This requires paint manufacturers to store many different paint ingredients and change paint ingredients during manufacture depending on the specific paint type being prepared.

Furthermore, it requires those in the supply chain, especially the paint retailers, to carry a large inventory of paints in the warehouse and on the store shelves in order to offer a range of paints, such as various sheen levels, tint bases, paints for exterior use, paints for interior use, and paints of varying quality. It would be desirable to make paints, either at a relatively large-scale industrial plant or at a relatively smaller-scale, point-of-sale or point-of-use location using a limited number of paint ingredients to prepare all of these different paint formulations, thus, minimizing the number and type of paint ingredients needed to make a range of paints.

SUMMARY OF THE INVENTION

A "paint line", as used herein, includes at least two different paints which offer dried film properties which differ materially from each other in at least one observable property such as sheen, outdoor durability or color depth. A paint line may include, for example, three paints the dried films of which have different sheen levels, two paints the dried films of which have suitable interior or exterior performance, or four paints the dried films of which offer different quality or performance levels such as may be evidenced, for example, by different levels of scrub resistance.

A paint line could, more particularly, include four different paints, the dried films of which have different sheen levels, typically marketed as gloss; semi-gloss; eggshell, satin, or low lustre; and flat. The sheen is determined by the volume and type of the binder(s), pigment(s), and extender (s), if any, in the paint.

In addition to the various sheen levels, paints are commonly formulated to be neutral or accent (no or very low level of opacifying pigment), untinted (white) or tinted to a wide variety of colors using different tint bases, including pastel or light tones, medium or mid-tones, and deep tones. This capability requires a paint line having as many as five paints. Also, paints are formulated for exterior or interior use. And, paints are formulated to provide certain levels of performance properties, such as may be marketed as good/standard, better and best/premium.

Paint manufacturers and retailers typically offer a range of paints which including at least two paint lines. By "the range including at least two paint lines" herein is meant that the discrete elected levels of the observable property defining a first paint line are combined with the discrete elected levels of the observable property defining a second paint line, etc. to define the paints in the range of paints.

To prepare a range of paints which includes four paint lines may require preparing paints encompassing four sheen levels, four tint bases, interior and exterior use, and three quality levels. For all combinations 96 different paint formulations (4×4×2×3) may be needed. Also encompassed, however, is a range of paints in which certain of the defined paints, certain proportion, including up to as high as 10–60%, of the total number of paints, are selected to be omitted, for example, for commercial reasons or because they are not stable as defined herein. Further contemplated is a range of paints in which the observable properties of the dried paint films substantially, but not exactly, fulfill the standard definitions for example, the sheen of a dried outdoor mid-tone gloss paint in the standard, better, and premium lines may differ by a few points without departing from the meaning of a range of paints of this invention.

As used herein, "paint" is term used in its broadest sense and includes any coating that may be applied to a surface for decorative, protective or both purposes. Specifically included are those systems employed for architectural coatings, industrial coatings, elastomeric coatings and non-cementitious, aggregate finish coatings employed as the topcoat over walls and in an exterior insulation and finishing system (referred to hereinafter as "EIFS").

As used herein, prepaints are "mutually compatible" if the paints formed by admixing the prepaints do not evidence signs of colloidal instability such as flocculation. Preferably, the paints formed from the prepaints exhibit less than 5 g of residue such as gel and grit per liter of paint when the paint is passed through a 325 mesh screen. More preferably, the paints formed from the prepaints exhibit less than 1 g of residue per liter of paint when the paint is passed through a 325 mesh screen. If the additives included to enhance specific paint properties, and colorants are fully compatible, i.e., they can be blended at any ratio without inducing colloidal instability, then they can be blended in any combination falling within the formulation space needed to achieve the desired property profile in the final paint. It is sufficient, however, for the prepaints, optional additives included to enhance specific paint properties, and colorants to be compatible, i. e., they can be blended at desired ratios without inducing colloidal instability to achieve the desired property profile in the range of paints.

In order to minimize the number of paint ingredients needed to prepare a range of paints one needs to consider the extremes of key properties required by the range of paints and formulate prepaints which are capable of being blended in various combinations to provide the key properties required, at their extreme values and at intermediate points as well. Specific properties may be improved by adding paint additives which enhance the desired property.

The above goal is achieved by employing a set of different, but mutually compatible, fluid prepaints sufficient to formulate at least one paint line. The set comprises (i) at least one opacifying prepaint comprising at least one opacifying pigment; (ii) at least one extender prepaint comprising at least one extender pigment; and (iii) at least one binder prepaint comprising at least one latex polymeric binder; Preferably, the number of prepaints is 3–15.

Also provided is a method of forming at least one paint line comprises the steps of:
(a) providing a set of different, but mutually compatible, fluid prepaints sufficient to formulate at least one paint line, which set comprises: (i) at least one opacifying prepaint including at least one opacifying pigment; (ii) at least one extender prepaint including at least one extender pigment; and (iii) at least one binder prepaint including at least one latex polymeric binder; and
(b) dispensing a predetermined amount each of the prepaints into containers or applicator(s) to form the paint line.
Preferably, the total number of prepaints is 3–15.

The method may further include the step of mixing the prepaints before, while, or after they are dispensed into the containers or before or while they are dispensed into the applicator(s).

Further provided is a method of forming a range of paints. The range includes at least two paint lines. The methods comprises the steps of:
(a) providing a set of different, but mutually compatible, fluid prepaints sufficient to formulate the range of paints, which set comprises (i) at least one opacifying prepaint including at least one opacifying pigment; (ii) at least one extender prepaint including at least one extender pigment; (iii) at least one binder prepaint including at least one latex polymeric binder; and (iv) at least one additional different prepaint selected from the group consisting of prepaints (i), (ii), and (iii); and (b) dispensing a predetermined amount of each of the prepaints into containers or applicator(s) to form the paint lines.

Preferably, the total number of prepaints is 4–15.

The methods may further comprise the step of mixing the prepaints before, while, or after they are dispensed into the container or before or while they are dispensed into the applicator(s). The methods may further include the step of adjusting the viscosity of the dispensed prepaints before, while, or after they are dispensed into the container or before or while they are dispensed into the applicator(s) using a thickener, water, or a mixture thereof. The methods may further comprise the step of adding additional materials that enhance the application or final performance properties of the paint, including aggregates and thickeners. The methods may further include the step of adding at least one colorant to the dispensed prepaints. The methods may be carried out at a paint manufacturing facility, a point-of-sale, or a point-of-use and may be controlled by a computer.

In another embodiment, a set of different, but mutually compatible fluid prepaints sufficient to form at least one paint line useful as an elastomeric coating is provided. The set comprises (i) at least one opacifying prepaint comprising at least one opacifying pigment; (ii) at least one extender prepaint comprising at least one extender pigment; and (iii) at least one binder prepaint comprising at least one latex polymer binder having a Tg less than about 0° C.

Further provided is a method of forming at least one paint line useful as an elastomeric coating. The method comprises the steps of:

(a) providing a set of different, but mutually compatible, fluid prepaints, which set comprises (i) at least one opacifying prepaint comprising at least one opacifying pigment; (ii) at least one extender prepaint comprising at least one extender pigment; and (iii) at least one binder prepaint comprising at least one latex polymeric binder having a Tg less than about 0° C.; and (b) dispensing a predetermined amount of each of the prepaints into containers or applicator(s) to form the paint line.

Further provided is a method of forming a range of paints. The range comprises at least two paint lines useful as elastomeric coatings. The method comprises the steps of:

(a) providing a set of different, but mutually compatible, fluid prepaints sufficient to formulate at least two paint lines, which set comprises: (i) at least one opacifying prepaint comprising at least one opacifying pigment; (ii) at least one extender prepaint comprising at least one extender pigment; (iii) at least one binder prepaint comprising at least one latex polymer binder having a Tg less than about 0° C.; and (iv) at least one additional different fluid prepaint selected from the group consisting of prepaints (i), (ii), and (iii); and (b) dispensing a predetermined amount of each of the prepaints into containers or applicator(s) devices to form the paint lines. In another embodiment, a set of different, but mutually compatible, fluid non-cementitious prepaints sufficient to form at least one paint line useful as a non-cementitious, aggregate finish is provided. The set comprises (i) at least one opacifying prepaint comprising at least one opacifying pigment; (ii) at least one extender prepaint comprising at least one extender pigment; (iii) at least one binder prepaint comprising at least one latex polymeric binder; and (iv) at least one prepaint comprising aggregate.

Also provided is a method of forming at least one paint line useful as a non-cementitious, aggregate finish. The method comprises the steps of:

(a) providing a set of different, but mutually compatible, fluid non-cementitious prepaints, which set comprises: (i) at least one opacifying prepaint comprising at least one opacifying pigment; (ii) at least one extender prepaint comprising at least one extender pigment; (iii) at least one binder prepaint comprising at least one latex polymeric binder; and (iv) at least one prepaint comprising an aggregate; and (b) dispensing a predetermined amount of each of the prepaints into containers or applicator(s) to form the paint line.

Further provided is a method of forming a range of paints. The range comprises at least two paint lines useful as a non-cementitious, aggregate finishing coatings. The method comprises the steps of:

(a) providing a set of different, but mutually compatible, fluid non-cementitious prepaints sufficient to formulate at least two paint lines, which set comprises: (i) at least one opacifying prepaint comprising at least one opacifying pigment; (ii) at least one extender prepaint comprising at least one extender pigment; (iii) at least one binder prepaint comprising at least one latex polymeric binder; (iv) at least one prepaint comprising aggregate; and (v) at least one additional different fluid prepaint selected from the group consisting of prepaints (i), (ii), (iii), and (iv); and (b) dispensing a predetermined amount of each of the prepaints into containers or applicator(s) to form the paint lines.

In another embodiment, a set of different, but mutually compatible, fluid prepaints sufficient to form at least one paint line useful for forming pigmented and clear coatings is provided. The set comprises: (i) at least one opacifying prepaint comprising at least one opacifying pigment; and (ii) at least two binder prepaints, each of which comprises at least one latex polymeric binder;

In another embodiment, a set of prepaints sufficient to form at least one paint line useful in graphics art applications is provided. The set comprises: (i) at least one binder prepaint comprising at least one latex polymeric binder having a Tg of about −50° C. to about 10° C.; (ii) at least one binder prepaint comprising at least one latex polymeric binder having a Tg of about 50 to about 140° C.; and (iii) optionally at least one binder prepaint comprising at least one latex polymeric binder having a Tg of about 0° C. to about 65° C. The graphic art prepaints may further comprise additional fluid mutually compatible prepaints selected from the group consisting of: (i) a prepaint comprising at least one alkali soluble resin; (ii) a prepaint comprising at least one gloss additive; (iii) a prepaint comprising at least one wax; and (iv) a plurality of prepaints comprising at least one pigment dispersion.

If one paint line is desired, i.e., if one key property is varied (for example, sheen level, tint base, use type, or quality type), then the complete paint line can be made from one each of the opacifying prepaint (i), the extender prepaint (ii), and the binder prepaint (iii).

If a range of paints including two paint lines is desired, i.e., if two key properties are varied (for example, two selected from sheen level, tint base, use type, and quality type) then the range of paints may be made from at least one each of the opacifying, extender, and binder prepaints (i), (ii) and (iii) and at least one additional different prepaint selected from the opacifying, extender, and binder prepaints (i), (ii), and (iii), depending on which key properties are to be varied.

If a range of paints including three paint lines is desired, i.e., if three key properties are varied (for example, three selected from sheen level, tint base, use type, and quality type) then the range of paints can be made from at least one each of the opacifying, extender, and binder prepaints (i), (ii) and (iii) and at least two additional prepaints different opacifying, extender, or binder prepaints, depending on which key properties are to be varied.

If a range of paints including four paint lines is desired, i. e., if four key properties are varied (for example, sheen level, tint base, use type, and quality type) then the complete range of paints can be made from at least one each of the opacifying, extender, and binder prepaints (i), (ii), and (iii) different and at least three additional different prepaints, opacifying, extender, and binder, depending on which key properties are to be varied.

This technique may be continued to vary as many additional key properties as desired.

By "additional opacifying, extender, and binder prepaints" is meant a prepaint different from the opacifying, extender, and binder prepaints (i), (ii), and (iii), respectively, but otherwise meeting the limitations associated with prepaints.

As discussed above, "paint line" includes two or more different paints whose dried films differ materially from each other in at least one observable property. The paints are different from each other and must meet at least one of the following criteria:
(1) the pigment volume concentration (PVC) of the paints which are most different must differ by at least 2%; or
(2) the volume solids (VS) of the paints which are most different must differ by at least 2%.

The pigment volume concentration (PVC) is a measure of how "binder-rich" a formulation is. It is calculated herein using the following formula:

$$PVC(\%) = \frac{\text{volume of pigment(s)} + \text{volume extender(s)}}{\text{volume of pigment(s)} + \text{volume extender(s)} + \text{volume binder(s)}} \times 100$$

The volume solids (VS) is the dry volume of pigment(s) plus the dry volume of extender(s) plus the dry volume of binder(s). It is calculated herein by the following formula:

$$VS(\%) = \frac{\text{dry volume of pigment(s)} + \text{dry volume of extender(s)} + \text{dry volume of binder(s)}}{\text{total volume of formulation}} \times 100.$$

If additives are present, their volume is not included in determining the total dry volume. In each of the above embodiments the prepaints are selected so that they cover a wide formulation space so that the desired final paint properties lie within the blend space defined by the prepaints at the extremes. In many cases the prepaints themselves will not be practical paints. But, by pushing the prepaints to these extremes one can maximize the blend space available for the set. When the prepaints, additives and colorants are all fully compatible, they can be blended at desired ratios to achieve the desired paint line(s) and range of paints without inducing colloidal instability. It is possible to make a specific paint in the paint line without utilizing each of the prepaints available in the set of prepaints. For example, a deep tone paint does not require the use of an opacifying pigment prepaint.

This technique is similar to the design principles used in statistical experimental design and analysis of mixture component designs; however, instead of designing a mixture space to explore the response surface within it, one is designing the boundaries of the mixture space to maximize the flexibility of the paint system. The key to success is to have mutual compatibility of the individual prepaint ingredients and prepaints across the mixture space.

Paint properties can be predicted in a number of ways. One approach is to develop response surface models of the blend space using standard Mixture Component experimental design statistical tools. These simple statistical models can then be used by a linear optimization program, by a massive grid search or by a graphical analysis tool. Another approach is to simply use empirical methods to determine which blends are needed for specific paint lines, then incorporate those simple empirical recipes in the paint making machine software.

An extension of the techniques is to have the paint machine automatically pretest certain key properties (e.g., viscosity, forced dry gloss or color) and make minor adjustments during the formulating of a paint from the prepaints. Having feedback loops in the paint machine can provide more precise matching of color, gloss, and viscosity targets.

Compatible paint ingredients can be combined in the various prepaints and the paints formed from the prepaints provide the properties characteristic of the amount of ingredient used.

It is preferred that the all fluid prepaints employed in the methods herein have the same or similar viscosities to aid in mixing.

The water-resistance, including blister resistance, wet adhesion, and scrub resistance of the paints prepared from the prepaint sets is expected to be improved because of the use of lower amounts of stabilizing materials such as surfactants which may be used relative to conventional formulating techniques. Further a line of pains or a range of paints prepared using the prepaints may react more predictably to added colorants, making color matching easier and facilitating the use of software for color matching. In addition, viscosity fluctuation in the final paint formulation is expected to be reduced because of the prior equilibration of ingredients in the prepaints.

The prepaints are formulated to maximize the flexibility of paint manufacturing. Rather than purchasing individual paint ingredients, paint manufacturers and even buyers at point-of-sale and point-of-use (paint stores, paint departments, and contractors), can purchase the set of prepaints to prepare a desired range of paints. These sets of prepaints will contain at least one each of prepaints x, y and z and possibly additional prepaints depending upon the formulating flexibility desired. Optionally, the above prepaints are mixed with an additional prepaint which includes at least one colorant, such as a colored pigment or dye.

The prepaint sets and formulating methods herein are not limited to the preparation of only latex paints. They may also be used to prepare any water-borne coating or related building products which require mixing ingredients, including, but not limited to, graphic arts, sealants, caulks, mastics, adhesives, architectural coatings (homeowner-applied and contractor-applied wall coatings, elastomeric wall and roof coatings and aggregate finish layers) and industrial coatings (such as those classified as original equipment manufacturing, maintenance, wood, metal, general industrial finishes, and other factory-applied coatings as well as a minor portion of non-architectural type coatings applied by do-it-yourselfers).

In the industrial coatings area, the methods herein may be applied to a broad range of coatings for automotive, marine, aircraft, other land transportation, appliances, metal furniture, machinery & equipment, coil, metal containers, magnetic wire, concrete roof tile, insulating varnish, electronic, pipe, packaging, overprint, release, flatboard, wood furniture, plastic substrates, magnetic media, general metal, industrial maintenance, automotive refinish, traffic paint, fire retardant, aerosol, chemical agent resistant coating, roof, tank, deck, concrete, masonry water repellent, nail polish, art and hobby uses. For example, the method herein may be applied to produce a range of metal coatings, including flat, gloss, direct-to-metal, primer, mid-coat and solvent resistant coatings, using an appropriate set of prepaints.

DETAILED DESCRIPTION OF THE INVENTION

In one embodiment of the opacifying prepaint, the prepaint is a fluid titanium dioxide prepaint which includes (i) at least one opacifying pigment, (ii) at least one dispersant, (iii) at least one thickener, and water. The dispersant(s) and the thickener(s) are compatible with the pigment(s) and with other optional paint ingredients. The prepaint has a volume solids content of about 30% to about 70%, preferably about 35% to about 50% and a Stormer viscosity of about 50 to about 250 KU, preferably about 60 to about 150 KU.

In an alternate embodiment, the opacifying prepaint is a fluid titanium dioxide prepaint useful for formulating a one pack, pigmented latex paint containing other paint ingredients. The prepaint includes (i) at least one opacifying pigment, (ii) at least one dispersant, (iii) at least one thickener, (iv) at least one film-forming or nonfilm-forming polymeric binder, and (v) water. The dispersant(s), the thickener(s), and the polymer(s) are compatible with the pigment(s) and with other optional paint ingredients. The prepaint has a volume solids content of about 30% to about 70%, preferably about 35% to about 50%, a PVC of about 35% to about 100%, preferably about 50% to about 100%, and a Stormer viscosity of about 50 to about 250 KU, preferably about 60 to about 150 KU. Preferably, the prepaint is stable to sedimentation, by which is meant herein that the pigment does not settle out after 10 days at 25° C. Optionally, the polymeric binder is adsorbed onto the opacifying pigment.

In one embodiment of the extender prepaint, it is a fluid pigment extender prepaint which includes (i) at least one mineral extender, (ii) at least one thickener, (iii) an optional polymeric binder, and (iv) water. The pigment extender prepaint has a volume solids content of about 30% to about 70%, preferably about 35% to about 65%, a PVC of about 35% to about 100%, preferably about 40% to about 100%, and a Stormer viscosity of about 50 to about 250 KU, preferably about 60 to about 150 KU. The prepaint ingredients are compatible with each other and with the ingredients of the other prepaints desired to be used therewith.

In one embodiment of the binder prepaint, it is a fluid latex polymeric binder prepaint which includes a waterborne latex polymeric binder having a Tg of about −40° C. to about 70° C., preferably about −10° C. to about 60° C., and water. The binder prepaint has a volume solids content of about 25% to about 70%, preferably about 30% to about 65%, and a Brookfield viscosity of less than about 100,000 centipoise, preferably about 100 to about 50,000 centipoise, at a shear rate of 1.25 reciprocal seconds. The prepaint ingredients are compatible with each other and with the ingredients of the other prepaints desired to be used therewith.

In the embodiments of prepaints the opacifying, extender, and binder prepaints (i), (ii), and (iii), it is optional to include minor amounts, i.e., less than about 20% by weight, based on the total weight of the prepaint, of conventional paint additives including an acid, a base, a defoamer, a coalescent, a cosolvent, a mildewcide, a biocide, an antifreeze agent, a flash rust inhibitor, and the like. These additives must be compatible with the other paint ingredients in the prepaints and the paints employed in the methods herein.

Suitable opacifying pigments include white pigments which impart white scattering power to the paint across all visible wavelengths without a high degree of absorption. Pigment extenders are inorganic solids or opaque polymers which do not impart the primary color or hiding power to the paint although they may have secondary influences on those properties. The tint bases used for deep tone paints typically contain no or only very low levels of opacifying pigments.

Suitable opacifying pigments include titanium dioxide ($TiO_2$) or a combination of titanium dioxide and auxiliary hiding pigments such as voided latex polymer particles, zinc oxide, lead oxide, a synthetic polymer pigment and mixtures thereof. Rutile and anatase grades of titanium dioxide are suitable for use herein. Rutile titanium dioxide is preferred. The surface of these titanium dioxides may be treated with various organic surface treatments and/or inorganic surface treatments, e.g., treatment with the oxides of silica, alumina, and zirconia. Fumed titanium oxide is also useful herein.

Suitable voided latex particles have a diameter of about 100 nm to about 2,500 nm and a void fraction of about 10% to about 75%. Preferably, the voided latex particles useful in the method of the invention have a particle size of about 500 nm to about 1,100 nm. OK particles have at least one void, but may have multiple voids, non-spherical voids, interconnected voids, voids having channels connected to the outside of the particles, and other structures described as vesiculated and spongelike. Preferably, the (Tg) have a single void. The particles have a glass transition temperature, as measured by differential scanning calorimetry at a rate of 20° C./min, of at least about 20° C., preferably at least about 50° C. The higher the Tg, the harder is the particle, making it less likely it is to collapse. If the voided latex particles collapse, they are unable to contribute to hiding. Voided latex particles they may be prepared by conventional polymerization processes known in the art, such as those disclosed in U.S. Pat. No. 3,784,391, U.S. Pat. No. 4,798,691, U.S. Pat. No. 4,908,271, U.S. Pat. No. 4,972,000, U.S. Pat. No. 5,041,464, U.S. Pat. No. 5,157,084, U.S. Pat. No. 5,216,044 and U.S. Pat. No. 6,020,435, as well as Japanese Patent Applications 60/223, 873, 61/62510, 61/66710, 61/86941, 62/127336, 62/156387, 01/185311, and 02/140272. Preferably, the voided latex particles are prepared according to U.S. Pat. No. 4,427,836, U.S. Pat. No. 4,469,825, U.S. Pat. No. 4,594,363, U.S. Pat. No. 4,880,842, U.S. Pat. No. 5,494,971 and U.S. Pat. No. 020,435.

Extender pigments useful herein include exterior and interior extender pigments optimized for the intended end use. Exterior extender pigments are not soluble in water and have a low absorption number. They are optimized for exterior durability in the particular market where the paint will be sold, and they do not detract from the desired non-cracking, non-chalking, and non-dirt-retaining properties of the dried paint. They also provide volume at a low cost. Interior extender pigments are optimized for hiding, gloss, and low cost. Suitable extender pigments include barium sulfate (1–15 microns), Blanc Fixe (0.5–5 microns), calcium carbonate (0.05–35 microns), silica (0.001–14 microns), magnesium silicate (0.5–15 microns), aluminum silicate (0.2–5 microns), nepheline syenite, mica, bentonite, magnesium alumino-silicate, fumed allumina, colloidal attapulgite, synthetic amorphous sodium alumino-silicate, sodium potassium alumino-silicate, and the like.

Latex polymeric binders are polymers or prepolymers which form the primary paint film. They bind the pigment and/or extenders, provide the required paint flow, and determine the gloss and hardness of the final paint film. The binders selected for the prepaints will depend upon the final use of the formulated paints. Binders suitable for exterior paints are generally suitable for interior paints, but binders suitable for interior paints may not be suitable for exterior paints.

Suitable latex polymeric binders include, but are not limited to, homopolymers, copolymers or terpolymers such as, for example, acrylic and/or methacrylic polymers or copolymers, polyvinyl acetate, styrene-acrylic copolymers, styrene-butadiene, vinyl acetate-acrylic copolymers, ethylene-vinyl acetate copolymers, vinyl acetate-vinyl versatate copolymers, vinyl acetate-vinyl maleate copolymers, vinyl acetate-vinyl chloride-acrylic terpolymers, ethylene-vinyl acetate-acrylic terpolymers, and urethane polymers. The polymers may contain up to 10% by weight of functional monomers, (for example, but not limited to, carboxylic acid, phosphate, sulfate, sulfonate and amide) groups, other monomers, and mixtures thereof. Latex polymeric binders optionally incorporated in prepaints x, y, x', y', or other prepaints may be the same as or different from the latex polymeric binder of prepaint z.

It is conceivable that for industrial coatings the prepaints will employ a wide range of thermoplastic and thermosetting polymeric binders, that may be one-pot, two-pot or energy-curable, in the prepaints and methods of the inventions, including but not limited to: asphalt, paraffin wax, coal tar, alkyds, vinyl acetate, vinyl acetate/acrylic, styrene-butadiene, saturated polyester, unsaturated polyester, polyurethane, acrylic lacquer, acrylic enamel, acrylic latex, acrylic thermosetting, acrylic electrodeposition and autodeposition, styrene acrylic, vinyl toluene acrylic, radiation-curable acrylic, melamine, urea, epoxy (diglycidyl ether of bisphenol A, bisphenol F, cycloaliphatic, monofunctional epoxies and the like), vinyl acetate copolymer N-methylolacrylamide, vinyl acetate-ethylene, vinyl acetate terpolymer, vinyl acetate-vinyl versatate, polyvinyl chloride, polyvinylidene chloride, ethylene-acrylic acid, ethylene-methacrylic acid, ionomer, ethylene-methyl acrylate, cellulosics, nitrocellulose, cellulose acetate butyrate, shellac, phenolic, ethyl silicate, polyacetals, styrene-allyl alcohol, chlorinated rubber, polyvinyl alcohol, butyl rubber, styrene—ethylene butylene—styrene block copolymer rubber, urethane acrylate, polyamideimide, polyesterimide, silicones, silanes, shellac, polyamides, polytetrafluoroethylene, polydiallyldimethylammonium chloride, polyphenylene sulfide, aromatic polyester, polyimide, siliconeimide, fluoropolymers, parylene, aramid, stelarate polymers, oleoresinous, and chlorinated polyolefin and bis-cyclobenzobutene, The polymeric binders are preferably water-borne latexes, but may also be solvent-borne, water reducible, redispersible latexes, and combinations thereof.

The polymeric binders may be one-pack or two-pack. If the polymeric binders are two-pack, the polymeric binders may be used by:

(1) separating one component of the two-pack system as a separate prepaint;
(2) separating one component of the two-pack system and including it in either the opacifying prepaint or the extender prepaint;
(3) adding one component of the two-pack system separately from any of the prepaints; and
(4) combinations thereof.

Thickener is a general term used to describe any material added to a paint to modify its rheological profile. Preferred thickeners are associative thickeners. Suitable thickeners for use herein include polyvinyl alcohol (PVA), hydrophobically-modified, alkali soluble emulsions known in the art as HASE emulsions, alkali-soluble or alkali, swellable emulsions known in the art as ASE emulsions, hydrophobically, modified ethylene oxide-urethane polymers known in the art as HEUR thickeners, and cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose, and the like. Also useful as thickeners are fumed silica, attapulgite clay and other types of clay, titanate chelating agents, and the like.

Suitable dispersants for use herein include non-ionic, anionic and cationic dispersants such as 2-amino 2-methyl 1-propanol (AMP), dimethyl amino ethanol (DMAE), potassium tripolyphosphate (KTPP), trisodium polyphosphate (TSPP), citric acid and other carboxylic acids, and the like. Also suitable for use as dispersants are Anionic polymers such as homopolymers and copolymers based on polycarboxylic acids, including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers as well as the salts of the aforementioned dispersants, and mixtures thereof.

Suitable defoamers include silicone-based and mineral oil-based defoamers, and the like.

Coalescents are not necessary if solvent-free latex polymer binders are used in the binder prepaints. Solvent-free binders typically have a low Tg and low minimum film-forming temperature so that they are film-forming at ambient temperatures, such as 20° C. If a coalescent is required, preferably it is incorporated in the binder prepaint and any other prepaints containing latex polymer binders.

Suitable coalescents, plasticizers, and other optional solvents include ethylene glycol, propylene glycol, hexylene glycol, 2,2,4-trimethyl-1,3-pentanediol monoisobutyrate (TEXANOL™), glycol ethers, mineral spirits, methyl carbitol, butyl carbitol, phthalates, adipates, and the like.

Suitable mildewcides and biocides include zinc oxide, isothiazolones, triazoles, and the like.

Suitable surfactants include cationic, anionic, and non-ionic surfactants.

Suitable aggregates include small (typically 40 mesh and higher), intermediate (typically 20–40 mesh) and large (typically 20 mesh and lower) aggregates, such as sand, large particle size carbonates (limestone), ceramics, glass, fibers, coal, granite, talc, multicolored quartz, crushed sea shells, recycled products such as asphalt-containing materials, fiberglass, vermiculite, perlite, XO aggregate and the like.

Suitable flash rust inhibitors include aminoethylethanol amine, ammonium benzoate, sodium nitrite, ammonia benzoate, ammonium and amine salts of dicarboxylic acids and diphenols, such as glutaric acid, malonic acid, suberic acid, sebacic acid, adipic acid, succinic acid, phthalic acid, isophthalic acid, terephthalic acid, thidiphenol and sulfonyldiphenol and their ammonium and amine-complexed zinc salts, C-12 to C-14-tert-alkylamines, compounds with (2-benzothiazolythio)-butanedioic acid; (2-benzothiazolyltio) butanedioic acid, 4-oxo-4-p-tolylbutryic acid adduct with 4-ethylmorpholine, zirconium complex with 4-methyl-δ-oxo-benzene-butanoic acid and the like.

Suitable crosslinkers include multivalent metal ions, such as zinc, magnesium, zirconium, calcium and like ions.

Reactive pigments are materials that are added to coating formulations to confer corrosion resistance by sacrificially corroding on behalf the substrate. Suitable reactive pigments include calcium zinc phosphomolydate, zinc phosphate, aluminum triphosphate, strontium zinc phosphosilicate, molybdate-modified zinc phosphate and the like.

Suitable waxes include carnauba, paraffin, polyethylene, micronized ethylene-acrylic acid, polytetrafluoroethylene (PTFE), and the like.

Alkali-soluble resins are polymers that contain sufficient acid functionality and low enough molecular weights to dissolve in an aqueous media when neutralized with base. They exhibit Newtonian rheology, and act as a dispersant (i.e, reduce the surface tension of the aqueous medium). Suitable alkali- soluble resins include esters of acrylic acid and methacrylic acid copolymerized with carboxylic acid monomers (such copolymers, for example, are available from the Rohm and Haas Company and sold under the trade names Acrysol™ I-62 and Acrysol™ I-2074), copolymers of styrene and acrylic acid with optional alpha-methyl styrene (such polymers, for example, are available from the Rohm and Haas Company and sold under the trade name Morez™ 101), styrene/maleic anhydride copolymers, and the like.

In another preferred embodiment, the prepaints and methods of the present invention may be used to make elastomeric coatings suitable for either wall or roof applications. These prepaints may be mixed in various ratios to obtain elastomeric coatings of different quality, flexibility, mildew protection, and substrate adhesion suitable for either application on wall or roofs.

The main feature that distinguishes elastomeric coatings from typical architectural coatings is the use of binders with low temperature (<0° C.) flexibility and the thickness at which the coating is applied (typically a dry coating thickness of about 6 to about 20 mil for wall applications and about 15 to about 40 mil for roof applications). Low temperature flexibility is particularly desirable for elastomeric coatings when they are being used over walls that may develop cracks, such as masonry walls, or roofing substrates that have a high degree of dimensional variance with climate. In addition to coating flexibility, it is desirable to have an elastomeric coating line with different degrees of low temperature flexibility, different qualities, ability to adhere to different substrates, and variations in appearance.

For a climate that experiences freezing temperatures through the winter, the following characteristics can be used to describe the different quality levels:

Quality Level

| Description | PVC | TiO$_2$ PVC | Flexibility Temperature |
|---|---|---|---|
| high | <40 | >5 | <0° F. |
| medium | <40 | 4–5 | <0° F. |
| medium | >40 | >5 | <0° F. |
| low | >40 | <4 | <0° F. |

For a climate that has only a few days of freezing temperatures through the winter, the following characteristics can be used to describe the different quality levels:

Quality Level

| Description | PVC | TiO$_2$ PVC | Flexibility Temperature |
|---|---|---|---|
| high | <40 | >5 | <0° F. |
| medium | <40 | 4–5 | <32° F. |
| medium | >40 | >5 | <32° F. |
| low | >40 | <4 | <32° F. |
| poor | >40 | >4 | <40° F. |

The quality of the elastomeric coating may be varied further depending on whether or not zinc oxide (ZnO) is present in the formulation. Zinc oxide changes the mechanical properties of the coating.

Finally, the elastomeric coating may be further varied through the addition of colorants. Typically, these colorants are dry ground and made in the coating grind portion.

For elastomeric coatings, one may define the following properties that may be varied in the coating manufacture to make different elastomeric coatings: coating flexibility, coating quality (durability), substrate adhesion and appearance To differentiate based on the flexibility of the elastomeric coating, one may adjust the Tg of the binder, the PVC of the coating, and the presence and level of zinc oxide. To differentiate based on the durability of the elastomeric coating, one may adjust the level of titanumdioxide (TiO$_2$). To differentiate based on the adhesion of the elastomeric coating to a substrate, one may formulate to coat a wall or a roof by varying the binder composition and level. To differentiate based on the appearance of the elastomeric coating, one may adjust the level and type of colorant. To obtain these different properties one may prepare a set of prepaints as set forth in Examples 36–41 below, and mix them in appropriate quantities to make elastomeric coatings that vary the properties described above.

In another preferred embodiment, the prepaints and methods herein may be used to make non-cementitious, aggregate finish coatings suitable for application on a wall directly or as a topcoat in exterior insulation and finishing systems (EIFS). These prepaints or preformulated components may be mixed in various ratios to obtain coatings of different flexibility, quality (durability), color, and texture.

The following formulation properties provide an example of how one may influence the durability of its non-cementitious, aggregate finish coatings used specifically for EIFS. Other types of aggregate finishes may have different ranges of PVC that correspond to different qualities. Therefore, the description below is only meant to be an example for aggregate finish coatings used in EIFS, and is not meant to define the PVC levels used in other non-cementitious, aggregate finish coatings.

Quality

| Description | PVC |
|---|---|
| high | <72 |
| medium | 72–77 |
| low | >77 |

In addition, one may define the following formulation properties that affect color strength. Other types of aggregate finishes may have different TiO$_2$ levels that correspond to different color strengths. Therefore, the description below is only meant to be an example for aggregate finish coatings used in EIFS, and is not meant to define TiO$_2$ levels used in other aggregate finishes.

| Description | TiO$_2$ PVC(%) |
|---|---|
| white, pastels | >1.5 |
| midtones | 0.5–1.5 |
| deep tones | <0.5 |

Finally, one may also define the following formulation properties that affect coating texture.

| Description | Small Aggregate | Large Aggregate |
|---|---|---|
| fine | >90% | ≦10% |
| coarse | ≦90% | >10% |

Further variations in aggregate finish performance can be achieved by varying binder flexibility or T$_g$.

As a specific embodiment of this invention relating to non-cementitious, aggregate finish coatings, one may vary the following properties in the coating manufacture to make different coatings: PVC level, TiO$_2$ level, Aggregate ratio and Binder T$_g$.

To differentiate based on the flexibility of the non-cementitious, aggregate finish coatings, one may adjust the Tg of the binder. To differentiate based on the durability of the non-cementitious, aggregate finish coatings, one may adjust the PVC of the coating. To differentiate based on the color the non-cementitious, aggregate finish coatings, one may adjust the level of TiO$_2$ and the type and level of colorant. To differentiate based on the texture of the non-cementitious, aggregate finish coatings, one may adjust the size and level of the large aggregate and the ratio of the large aggregate to small aggregate. To obtain these different properties one may prepare a set of prepaints as set forth in Examples 54–58 below, and mix them in appropriate quantities to make non-cementitious, aggregate finish coatings that vary the properties described above.

In another preferred embodiment, the prepaints may be used in the methods of the invention to form a range of coatings useful where some of the coatings contain opacifying and/or extender pigments and where some of the coatings do not contain opacifying pigments ("clears"). These coatings may be applied over a variety of substrates, including metal, wood, and cementitious substrates, such as concrete roof tiles.

In another preferred embodiment, the prepaints may be used in the methods herein to form a range of graphic arts paint lines useful for a number of applications including, but not limited to, inks for giftwrap paper, corrugated substrate, newsprint, paperboard, labels, freezer bags, storage bags, metal films, foils; as well as overprint coatings applied for general purposes such as water-resistance, rub-resistance and high slip.

All ranges disclosed herein are inclusive and the minimums and maximums of the nested ranges are combinable.

Test Procedures

The Stormer viscosity of the prepaints is measured using ASTM method D562. The Brookfield viscosity of the binder prepaints and final paints is measured using spindle #4 of a Brookfield viscometer at 6 rpm. The ICI viscosity of the prepaints and paints is measured using ASTM method D3205–77. Glass transition temperature ("Tg") may be measured via differential scanning calorimetry at a rate of 20° C./minute.

EXAMPLES

Example 1

This example describes the preparation of a white prepaint which was prepared by combining the following ingredients:

| Ingredient | Amount (lbs./100 gallons) |
|---|---|
| Pigment - Titanium Dioxide Slurry (76.5% solids) (Ti-Pure ™ R-746 - DuPont) | 1152.25 |
| Dispersant (Tamol ™ 1124 - Robin and Haas) | 7.06 |
| Defoamer (Drewplus ™ L-475) | 1.00 |
| Binder Acrylic (50% solids - Tg 28° C.) (Rhoplex ™ SG-10M - Rohm and Haas) | 166.32 |
| Opacifer - Voided Latex Particles (Ropaque ™ OP-96 - Rohm and Haas) | 151.80 |
| Coalescent (Texanol ™) | 12.95 |
| Rheology Modifier (Acrysol ™ RM-8W - Rohm and Haas) | 12.76 |
| Base - Ammonia (28%) | 1.65 |

The prepaint was prepared using a laboratory mixer having a 45° pitch stirring blade. The water, dispersant, and defoamer, were combined and mixed. The titanium dioxide slurry was slowly added and the mixture was stirred for 15–20 minutes. The binder, coalescent, rheology modifier, ammonia, and additional water if necessary were then added.

The resulting prepaint had a total volume of 100 gallons, total weight of 1,505.8 lbs., total PVC of 80.0%, volume solids of 44.0%, weight solids of 67.1%, density of 15.058 lbs./gallon, 0.40% dispersant on pigment solids, and 10.0% coalescent on latex solids. Its initial and equilibrated Stormer viscosities were 88 and 90 KU. Its initial and equilibrated pH values were 8.8 and 8.6.

Example 2

This example describes the preparation of an exterior pigment extender prepaint. It was prepared as above by combining the following ingredients:

| Ingredient | Amount (lbs./100 gallons) |
|---|---|
| Pigment - Nepheline Syenite (7.5μ) (Minex ™ 4) | 784.30 |
| Dispersant (Tamol ™ 1124 - Rohm and Haas) | 7.84 |
| Defoamer (Drewplus ™ L-475) | 2.00 |
| Binder Acrylic (53.5% solids - Tg 18° C.) (Rhoplex ™ ML-200 - Rohm and Haas) | 157.49 |
| Coalescent (Texanol ™) | 5.90 |
| Rheology Modifier (Acrysol ™ RM-8W - Rohm and Haas) | 2.55 |
| Water | 368.86 |

The resulting prepaint had a total volume of 100 gallons, total weight of 1,328.9 lbs., total PVC of 80.0%, volume solids of 45.0%, weight solids of 65.4%, density of 13.29 lbs./gallon, 0.50% total dispersant on pigment solids and 7.0% total coalescent on binder solids. The initial and equilibrated Stormer viscosities were 90 and 93. The initial and equilibrated pH values were 8.9 and 8.7.

Example 3

This example describes the preparation of an interior pigment extender prepaint which was prepared as described above by combining the following ingredients:

| Ingredient | Amount (lbs./100 gallons) |
|---|---|
| Pigment - Calcium Carbonate (12µ) (Omyacarb ™ 12) | 405.67 |
| Pigment - Calcium Carbonate (3.2µ) (Vicron ™ 15-15) | 203.59 |
| Pigment - Aluminum Silicate (1.4µ) (Optiwhite ™) | 165.41 |
| Dispersant (Tamol ™ 1124 -Rohm and Haas) | 7.75 |
| Defoamer (Drewplus ™ L-475) | 1.00 |
| Binder - Vinyl Acetate/Acrylic (55% solids - Tg 14° C.) (RES ™ 3803- Rohm and Haas) | 157.61 |
| Coalescent (Texanol ™) | 6.07 |
| Rheology Modifier - HEUR (Acrysol ™ RM-2020-NPR) | 17.53 |
| Base - Ammonia (28%) | 0.87 |
| Water | 356.59 |

The resulting prepaint had a total volume of 100 gallons, total weight of 1,322.1 lbs., total PVC of 80%, volume solids of 45%, weight solids of 65.15%, density of 13.2210 lbs./gallon, 0.50% dispersant on pigment solids, and 7.00% coalescent on binder solids, Its initial and equilibrated Stormer viscosities were 94 and 97. Its initial and equilibrated pH values were both 9.2.

Example 4

This example describes a vinyl acetate/acrylic latex polymer binder prepaint which was prepared as described above except that the binder, defoamer, coalescent, ammonia, water, and rheology modifier were combined and mixed. The ingredients and amounts were as follows:

| Ingredient | Amount (lbs./100 gallons) |
|---|---|
| Defoamer (Drewplus ™ L-475) | 8.00 |
| Binder - Vinyl Acetate/Acrylic (55% solids - Tg 14° C.) (RES ™ 3803- Rohm and Haas) | 788.06 |
| Coalescent (Texanol ™) | 30.34 |
| Rheology Modifier -HEUR (Acrysol ™ SCT-275 - Rohm and Haas) | 3.02 |
| Base - Ammonia (28%) | 1.95 |
| Water | 60.08 |

The resulting prepaint had a total volume of 100 gallons, total weight of 891.5 lbs., volume solids of 45.0%, a weight solids of 48.6%, a density of 8.91 lbs./gallon and 7.0% coalescent on binder solids. Its initial and equilibrated Stormer viscosities were 88 and 90. Its initial and equilibrated pH values were 8.6 and 8.4. Its equilibrated Brookfield viscosity should be less than 10,000 cps.

Example 5

This example describes a flat acrylic binder prepaint which was prepared as above by combining the following ingredients:

| Ingredient | Amount (lbs./100 gallons) |
|---|---|
| Defoamer (Drewplus ™ L-475) | 8.00 |
| Binder - Acrylic (53.5% solids - Tg 18° C.) (Rhoplex ™ ML-200 - Rohm and Haas) | 769.96 |
| Coalescent (Texanol ™) | 28.83 |
| Rheology Modifier (HEUR) (Acrysol ™ RM-8W - Rohm and Haas) | 1.15 |
| Base - Ammonia (28%) | .57 |
| Solvent - Propylene Glycol | 60.00 |
| Water | 12.84 |

The resulting prepaint had a total volume of 100 gallons, total weight of 881.4 lbs., volume solids of 44.0%, weight solids of 46.7%, density of 8.81 lbs./gallon, and 7.0% coalescent on binder solids. Its initial and equilibrated Stormer viscosities were 91 and 89. Its initial and final pH values were both 8.9/9.0. Its equilibrated Brookfield viscosity should be less than 10,000 cps.

Example 6

This example describes a gloss acrylic binder prepaint which was prepared as described above by combining the following ingredients:

| Ingredient | Amount (lbs./100 gallons) |
|---|---|
| Defoamer (Drewplus ™ L-475) | 8.00 |
| Binder - Acrylic (50% solids - Tg 28° C.) (Rhoplex ™ SG-10M - Rohm and Haas) | 737.08 |
| Coalescent (Texanol ™) | 36.85 |
| Rheology Modifier - HEUR (Acrysol ™ RM 8W - Rohm and Haas) | 11.62 |
| Base - Ammonia (28%) | .35 |
| Solvent - Propylene Glycol | 60.00 |
| Water | 21.26 |

The resulting prepaint had a total volume of 100 gallons, a total weight of 875.2 lbs., volume solids of 39.0%, a weight solids of 42.11%, a density of 8.75 lbs./gallon and 10.0% coalescent on binder solids. Its initial and equilibrated Stormer viscosities were 97 and 98. The initial and equilibrated pH values were 9.0. Its equilibrated Brookfield viscosity should be less than 10,000 cps.

Example 7

This example describes the preparation of a white pigment prepaint including a solvent-free acrylic binder and without the use of a coalescent. The ingredients are mixed as described in Example 1 using the ingredients and amounts set out below.

| Ingredient | Amount (lbs./100 gallons) |
|---|---|
| Pigment - Titanium Dioxide (Ti-Pure ™ R-706 - DuPont) | 734.49 |
| Opacifier - Voided Latex Particles (Ropaque ™ OP-96 - Rohm and Haas) | 164.43 |
| Dispersant (Tamol ™ 731 - Rohm and Haas) | 29.38 |
| Non-ionic Surfactant (Triton ™ CF-10) | 2.00 |
| Biocide (Kathon ™ LX (1.5%) - Rohm and Haas) | 2.00 |

-continued

| Ingredient | Amount (lbs./100 gallons) |
|---|---|
| Defoamer (Foamaster ™ VL) | 3.00 |
| Binder - Acrylic copolymer (43.5% solids - Tg -2° C.) (Rhoplex ™ SF-012 - Rohm and Haas) | 165.96 |
| Rheology Modifier - HEUR (Acrysol ™ RM-825 - Rohm and Haas) | 5.00 |
| Rheology Modifier - HEUR (Acrysol ™ RM-2020 NPR - Rohm and Haas) | 42.69 |
| Base - Ammonia (28%) | .49 |
| Water | 250.13 |

The resulting prepaint should have a total volume of 100 gallons, total weight of 1,401.3 lbs., total PVC of 80.0%, volume solids of 40.0%, weight solids of 61.1% density of 14.01 lbs./gallon, and 1.0% dispersant on pigment solids. Its estimated Stormer viscosity is 102 KU. Its pH should be 8.5–9.0.

Example 8

This example describes the preparation of an exterior pigment extender prepaint with a solvent-free acrylic binder without the use of a coalescent. The ingredients are mixed as described in Example 1 using the ingredient amounts set out below.

| Ingredient | Amount (lbs./100 gallons) |
|---|---|
| Pigment - Nepheline Syenite (7.5μ) (Minex ™ 4) | 697.16 |
| Dispersant (Tamol ™ 731 - Rohm and Haas) | 27.89 |
| Non-ionic Surfactant (Triton ™ CF-10) | 2.00 |
| Biocide (Kathon ™ LX (1.5%) - Rohm and Haas) | 2.00 |
| Defoamer (Foamaster ™ VL) | 3.00 |
| Binder - Acrylic (46.5% solids - Tg 1° C.) (Primal ™ SF-015 Rohm and Haas) | 160.84 |
| Rheology Modifier HEUR (Acrysol ™ RM-2020 NPR - Rohm and Haas) | 101.80 |
| Water | 284.47 |

The resulting prepaint should have a total volume of 100 gallons, total weight of 1,280.9 lbs., total PVC of 80.0%, volume solids of 40.0%, weight solids of 60.27%, density of 12.81 lbs./gallon, and 1.0% dispersant on pigment solids. Its Stormer viscosity should be 95 KU. Its pH should be 8.5–9.0. If not, the pH is adjusted as described in Example 7.

Example 9

This example describes the preparation of an interior pigment extender prepaint including a solvent-free vinyl acetate/acrylic binder without the use of a coalescent. The ingredients are mixed as described in Example 1 using the ingredient amounts set out below.

| Ingredient | Amount (lbs./100 gallons) |
|---|---|
| Pigment - Calcium Carbonate (3.2μ) (Snowflake ™) | 451.20 |
| Pigment - Aluminum Silicate (1.4μ) (Optiwhite ™) | 220.37 |
| Dispersant (Tamol ™ 1254 - Rohm and Haas) | 19.19 |
| Non-ionic Surfactant (Triton ™ CF-10) | 2.00 |
| Biocide (Kathon ™ LX (1.5%)) | 2.00 |

-continued

| Ingredient | Amount (lbs./100 gallons) |
|---|---|
| Defoamer (Foamaster ™ VL) | 3.00 |
| Binder - Vinyl Acetate/Acrylic (55% solids) (Rovace ™ 9900) | 139.86 |
| Rheology Modifier HASE (Acrysol ™ DR-3) | 9.00 |
| Base - Ammonia (28%) | 0.86 |
| Water | 405.69 |

The resulting prepaint should have a total volume of 100 gallons, a total weight of 1,254.9 lbs., total PVC of 80.0%, volume solids of 40.0%, weight solids of 59.65%, density of 12.55 lbs./gallon, and 1.0% dispersant on pigment solids. Its Stormer viscosity should be 95 KU. Its pH should be 8.5–9.0.

Example 10

This example describes the preparation of a vinyl acetate/acrylic latex polymer binder prepaint including a solvent-free vinyl acetate/acrylic binder without a coalescent. The ingredients are mixed as described in Example 4 using the ingredient amounts set out below.

| Ingredient | Amount (lbs./100 gallons) |
|---|---|
| Binder - Vinyl Acetate/Acrylic (55% solids - Tg 10° C.) (Rovace ™ 9900 - Rohm and Haas) | 699.25 |
| Defoamer (Foamaster ™ VL) | 3.00 |
| Rheology Modifier HASE (Acrysol ™ DR-3 - Rohm and Haas) | 12.96 |
| Base - Ammonia (28%) | 2.90 |
| Water | 405.69 |

The resulting prepaint should have a total volume of 100 gallons, total weight of 885.2 lbs, volume solids of 40.0%, a weight solids of 43.5%, and density of 8.85 lbs/gallon. Its Stormer viscosity should be 99 KU. Its Brookfield viscosity should be less than 10,000 cps. Its pH should be 8.5–9.0.

Example 11

This example describes the preparation of a flat latex polymer binder prepaint including a solvent-free acrylic binder and no coalescent. The ingredients are mixed as described in Example 4 using the ingredient amounts set out below.

| Ingredient | Amount (lbs./100 gallons) |
|---|---|
| Defoamer (Foamaster ™ VL) | 8.00 |
| Binder - Acrylic Copolymer (43.5% solids - Tg -2° C.) (Rhoplex ™ SF -012 - Rohm and Haas) | 723.77 |
| Rheology Modifier - HEUR (Acrysol ™ RM - 2020 NPR - Rohm and Haas) | 3.00 |
| Water | 133.75 |

The resulting prepaint should have a total volume of 100 gallons, a total weight of 868.5 lbs, volume solids of 36.0%, weight solids of 38.8% and density of 8.69 lbs./gallon. Its Stormer viscosity should be 99 KU. Its Brookfield viscosity should be less than 10,000 cps. Its pH should be 8.5–9.0 and, if not, it is adjusted as discussed above.

Example 12

This example describes the preparation of a gloss latex polymer binder prepaint using a solvent-free acrylic binder and no coalescent. The ingredients are mixed as described in Example 4 using the ingredient amounts set out below.

| Ingredient | Amount (lbs./100 gallons) |
|---|---|
| Defoamer (Foamaster ™ VL) | 8.00 |
| Binder - Acrylic Copolymer (43.5% solids - Tg −2° C.) (Rhoplex ™ SF-012 - Rohm and Haas) | 767.57 |
| Rheology Modifier - HEUR (Acrysol ™ RM-2020 NPR - Rohm and Haas) | 23.00 |
| Water | 61.62 |

The resulting prepaint should have a total volume of 100.0 gallons, total weight of 860.4 lbs, volume solids of 37.0%, a weight solids of 38.8% and a density of 8.60 lbs/gallon. Its Stormer viscosity should be 99 KU. Its Brookfield viscosity should be less than 10,000 cps. Its pH should be 8.5–9.0 and, if not, it should be adjusted as described above.

Example 13

This example describes the preparation of a white pigment prepaint using an interior gloss grade titanium dioxide which was prepared by combining the following ingredients:

| Ingredient | Amount (lbs./100 gallons) |
|---|---|
| Pigment - Titanium Dioxide (Ti-Pure ™ R-900 - DuPont) | 734.49 |
| Opacifier - Voided Latex Particles (30.5% solids) (Ropaque ™ Ultra-Rohm and Haas) | 164.43 |
| Dispersant (Tamol ™ 1254 - Rohm and Haas) | 20.99 |
| Non-ionic Surfactant (Triton ™ CF-10) | 2.00 |
| Biocide (Kathon ™ LX (1.5%) - Rohm and Haas) | 2.00 |
| Defoamer (Foamaster ™ VL - source) | 3.00 |
| Binder - Vinyl Acetate/Acrylic (55% solids - Tg 14° C.) (RES 3083 - Rohm and Haas) | 140.10 |
| Coalescent (Texanol ™) | 11.37 |
| Rheology Modifier - HASE (Acrysol ™ DR-3) | 11.47 |
| Base - Ammonia (28%) | 1.20 |
| Solvent - Propylene Glycol | 50.00 |
| Water | 264.38 |

The resulting prepaint had a total volume of 100 gallons, a total weight of 1405.4 lbs, total PVC of 80%, volume solids of 40%, weight solids of 61.25%, density of 14.05 lbs/gallon, 1.0% dispersant on pigment solids, and 9.0% coalescent on binder solids. The Stormer viscosity was 100 KU. The Brookfield viscosity was 15,300 cps. The pH was 8.8.

Example 14

This example describes the preparation of a white pigment prepaint using an exterior gloss grade titanium dioxide which was prepared by combining the following ingredients:

| Ingredient | Amount (lbs./100 gallons) |
|---|---|
| Pigment - Titanium Dioxide (Ti-Pure ™ R-706 - DuPont) | 734.56 |
| Opacifier - Voided Latex Particles (30.5% solids) (Ropaque ™ Ultra-Rohm and Haas) | 164.44 |
| Dispersant (Tamol ™ 731- Rohm and Haas)) | 29.38 |
| Non-ionic Surfactant (Triton ™ CF-10) | 2.00 |
| Biocide (Kathon ™ LX (1.5%) - Rohm and Haas) | 2.00 |
| Defoamer (Foamaster ™ VL) | 3.00 |
| Binder - Acrylic Copolymer (50% solids - Tg 28° C.) (Rhoplex ™ SG-10 - Rohm and Haas) | 151.20 |
| Coalescent (Texanol ™) | 12.49 |
| Rheology Modifier) HEUR (Acrysol ™ RM-2020 NPR - Rohm and Haas) | 42.69 |
| Base - Ammonia (28%) | .49 |
| Solvent - Propylene Glycol | 50.00 |
| Water | 211.34 |

The resulting prepaint had a total volume of 100 gallons, a total weight of 1403.6 lbs, total PVC of 80%, volume solids of 40%, weight solids of 61.2%, density of 14.04 lbs/gallon, 1.0% dispersant on pigment solids, and 9.0% coalescent on binder solids. The Stormer viscosity was 100 KU. The Brookfield viscosity was 4,010 cps. The pH was 8.8.

Example 15

This example describes the preparation of an exterior pigment extender prepaint. It was prepared by combining the following ingredients:

| Ingredient | Amount (lbs./100 gallons) |
|---|---|
| Pigment - Nepheline Syenite (7.5μ) (Minex ™ 4) | 697.16 |
| Dispersant (Tamol ™ 731 - Rohm and Haas) | 27.89 |
| Non-ionic Surfactant (Triton ™ CF-10) | 2.00 |
| Biocide Kathon ™ LX (1.5%) - Rohm and Haas) | 2.00 |
| Defoamer (Foamaster ™ VL) | 3.00 |
| Binder - Acrylic (53.5% solids - Tg 18° C.) (Rhoplex ™ Multilobe 200 - Rohm and Haas) | 139.98 |
| Coalescent (Texanol ™) | 5.24 |
| Rheology Modifier - HEUR (Acrysol ™ RM - 2020 - Rohm and Haas) | 101.80 |
| Solvent - Propylene Glycol | 50.00 |
| Water | 254.40 |

The resulting prepaint had a total volume of 100 gallons, a total weight of 1281.5 lbs, total PVC of 80.0%, volume solids of 40.0%, weight solids of 60.3%, density of 12.81 lbs/gallon, 1.0% dispersant on pigment solids, and 7.0% total coalescent on binder solids. The Stormer viscosity was 96 KU. The Brookfield viscosity was 7,210 cps. The pH was 9.8.

Example 16

This example describes the preparation of an interior pigment extender prepaint. It was prepared by combining the following ingredients:

| Ingredients | Amounts (lbs./100 gallons) |
|---|---|
| Pigment - Calcium Carbonate (5μ) (Snowflake ™) | 451.20 |
| Pigment - Aluminum Silicate (1.4μ) (Optiwhite ™) | 220.37 |

-continued

| Ingredients | Amounts (lbs./100 gallons) |
|---|---|
| Dispersant (Tamol ™ 1254 - Rohm and Haas) | 19.19 |
| Non-ionic Surfactant (Triton ™ CF-10) | 2.00 |
| Biocide (Kalthon ™ LX (1.5%) - Rohm and Haas) | 2.00 |
| Defoamer (Foamaster ™ VL) | 3.00 |
| Binder - Vinyl Acetate/Acrylic (55% solids - Tg 14° C.) (RES 3083 - Rohm and Haas) | 140.10 |
| Coalescent (Texanol ™) | 6.93 |
| Rheology Modifier - HASE (Acrysol ™ DR-3 - Rohm and Haas) | 11.00 |
| Base - Ammonia (28%) | 0.86 |
| Solvent - Propylene Glycol | 50.00 |
| Water | 348.48 |

The resulting prepaint had a total volume of 100 gallons, a total weight of 1255.1 lbs, total PVC of 80.0%, volume solids of 40.0%, a weight solids of 59.7%, density of 12.55 lbs/gallon, 1.0% dispersant on pigment solids, and 9.0% total coalescent on binder solids. The Stormer viscosity was 102 KU. The Brookfield viscosity was 3,410 cps. The pH was 8.9.

Example 17

This describes the preparation of a vinyl acetate/acrylic binder prepaint. It was prepared by combining the following ingredients:

| Ingredients | Amounts (lbs./100 gallons) |
|---|---|
| Defoamer (Foamaster ™ VL) | 3.00 |
| Binder - Vinyl Acetate/Acrylic (55% solids - Tg 14° C.) (RES 3083 - Rohm and Haas) | 700.48 |
| Coalescent (Texanol ™) | 34.67 |
| Rheology Modifier - HASE (Acrysol ™ DR-3 - Rohm and Haas) | 12.96 |
| Base - Ammonia (28%) | 2.90 |
| Solvent - Propylene Glycol | 50.00 |
| Water | 83.48 |

The resulting prepaint had a total volume of 100 gallons, a total weight of 887.5 lbs, volume solids of 40.0%, a weight solids of 43.4%, a density of 8.88 lbs/gallon, 9.0% coalescent on binder solids. Its Stormer viscosity was 98.0. The Brookfield viscosity was 13,600 cps. Its pH was 9.0.

Example 18

This example describes the preparation of a flat acrylic binder prepaint. It was prepared by combining the following ingredients:

| Ingredients | Amounts (lbs./100 gallons) |
|---|---|
| Defoamer (Foamaster ™ VL) | 3.00 |
| Binder - Acrylic (53.5% solids - Tg 18° C.) (Rhoplex ™ Multilobe 200 - Rohm and Haas) | 699.92 |
| Coalescent (Texanol ™) | 26.21 |
| Rheology Modifier - HEUR (Acrysol ™ RM-2020 NPR - Rohm and Haas) | 1.44 |
| Base - Ammonia (28%) | 0.35 |
| Solvent - Propylene Glycol | 50.00 |
| Water | 96.59 |

The resulting prepaint had a total volume of 100 gallons, a total weight of 877.5 lbs, volume solids of 40.0%, weight solids of 42.7%, density of 8.78 lbs/gallon, 7.0% coalescent on binder solids. Its Stormer viscosity was 94.0. The Brookfield viscosity was 4,900 cps. Its pH was 8.9.

Example 19

This example describes the preparation of a gloss acrylic binder prepaint. It was prepared by combining the following ingredients:

| Ingredients | Amounts (lbs./100 gallons) |
|---|---|
| Defoamer (Foamaster ™ VL) | 3.00 |
| Binder - Acrylic Copolymer (50% solids - Tg 28° C.) (Rhoplex ™ SG-10M - Rohm and Haas) | 755.99 |
| Coalescent (Texanol ™) | 37.80 |
| Rheology Modifier - HEUR (Acrysol ™ RM-2020 NPR - Rohm and Haas) | 11.62 |
| Base - Ammonia (28%) | 0.35 |
| Solvent - Propylene Glycol | 50.00 |
| Water | 17.68 |

The resulting prepaint had a total volume of 100 gallons, a total weight of 876.4 lbs, volume solids of 40.0%, weight solids of 43.1%, a density of 8.76 lbs/gallon, 10.0% coalescent on binder solids. Its Stormer viscosity was 96. The Brookfield viscosity was 5,000 cps. Its pH was 8.8.

Example 20

This example describes the preparation of a white prepaint by combining the following ingredients:

| Ingredient | Amount (lbs./100 gallons) |
|---|---|
| Pigment - Titanium Dioxide (Ti-Pure ™ R-706 - DuPont) | 1001.66 |
| Dispersant (Tamol ™ 1124 - Rohm and Haas) | 20.03 |
| Defoamer (Drewplus ™ L-475) | 1.00 |
| Binder Acrylic (50% solids - Tg 28° C. (Rhoplex ™ SG - 10M - Rohm and Haas) | 189.00 |
| Opacifer - Voided Latex Particles (Ropaque ™ OP-96 - Rohm and Haas) | 172.50 |
| Coalescent (Texanol ™) | 14.72 |
| Rheology Modifier (Acrysol ™ RM-8W - Rohm and Haas) | 2.00 |
| Base - Ammonia (28%) | 1.65 |
| Water | 200.44 |

The resulting prepaint should have a total volume of 100 gallons, a total weight of 1,603.0 lbs., total PVC of 80.0%, volume solids of 50.0%, weight solids of 71.7%, a density of 16.03 lbs./gallon, 1% dispersant on pigment solids, and 10.0% coalescent on latex solids.

Example 21

This example describes the preparation of a white pigment prepaint with pigmented vesiculated polymeric bead.

The pigmented vesiculated polymeric bead has a particle size of 12.5 microns, approximately 7% (s/s) titanium dioxide, and a void volume of approximately 77%. The ingredients are mixed as described in Example 1 using the ingredient amounts set out below.

| Ingredient | Amount (lbs./100 gallons) |
|---|---|
| Pigmented Vesiculated Polymeric Bead (Spindrift ™ 25) | 733.00 |
| Dispersant (Tamol ™ 1124 - Rohm and Haas) | 0 |
| Defoamer (Drewplus ™ L-475) | 2.00 |
| Binder Acrylic (53.5% solids - Tg 18° C.) (Rhoplex ™ ML-200 - Rohm and Haas) | 154 |
| Coalescent (Texanol ™) | 5.90 |
| Rheology Modifier (Acrysol ™ RM-8W - Rohm and Haas) | 2.55 |
| Water | 15.89 |

The resulting prepaint should have a total volume of 100 gallons, total weight of 913.3 lbs, total PVC of 80.0%, volume solids of 44.0%, weight solids of 28.28%, and density of 9.13 lbs/gallon. Its Stormer viscosity should be 91 KU. Its pH should be 8.5–9.0. If not, the pH is adjusted as described in Example 7.

Example 22

This example describes the preparation of an exterior pigment extender prepaint by combining the following ingredients:

| Ingredient | Amount (lbs./100 gallons) |
|---|---|
| Pigment - Nepheline Syenite (7.5μ) (Minex ™ 4) | 871.44 |
| Dispersant (Tamol ™ 1124 - Rohm and Haas) | 8.71 |
| Defoamer (Drewplus ™ L-475) | 2.00 |
| Binder Acrylic (60.5% solids - Tg 16° C.) (Rhoplex ™ AC-264 - Rohm and Haas) | 154.74 |
| Coalescent (Texanol ™) | 6.56 |
| Rheology Modifier (Acrysol ™ RM-8W - Rohm and Haas) | 3.00 |
| Water | 326.08 |

The resulting prepaint should have a total volume of 100 gallons, total weight of 1,382.5 lbs., total PVC of 80.0%, volume solids of 50.0%, weight solids of 69.8%, density of 13.82 lbs./gallon, 0.5% dispersant on pigment solids, and 7.0% coalescent on latex solids.

Example 23

This example describes the preparation of an interior pigment extender prepaint by combining the following ingredients:

| Ingredient | Amount (lbs./100 gallons) |
|---|---|
| Pigment - Calcium Carbonate (12μ) (Omyacarb ™ 12) | 450.67 |
| Pigment - Calcium Carbonate (3.2μ) (Vicron ™ 15-15) | 226.17 |
| Pigment - Aluminum Silicate (1.4μ) (Optiwhite ™) | 183.76 |
| Dispersant (Tamol ™ 1124 - Rohm and Haas) | 8.61 |
| Defoamer (Drewplus ™ L-475) | 1.00 |
| Binder - Vinyl Acetate/Acrylic (55% solids - Tg 14° C.) (RES 3803) | 175.09 |
| Coalescent (Texanol ™) | 6.74 |
| Rheology Modifier - HEUR (Acrysol ™ SCT-275) | 15.00 |
| Base - Ammonia (28%) | 0.87 |
| Water | 308.13 |

The resulting prepaint should have a total volume of 100 gallons, total weight of 1376.0 lbs, total PVC of 80.0%, volume solids of 50.0%, weight solids of 69.5%, density of 13.76 lbs/gallon, 0.5% dispersant on pigment solids, and 7.0% coalescent on latex solids.

Example 24

This example describes the preparation of a vinyl acetate/acrylic binder prepaint by combining the following ingredients:

| Ingredient | Amount (lbs./100 gallons) |
|---|---|
| Defoamer (Drewplus ™ L-475) | 2.00 |
| Binder - Vinyl Acetate/Acrylic (55% solids - Tg 14° C.) (RES 3803) | 875.62 |
| Coalescent (Texanol ™) | 13.00 |
| Rheology Modifier HEUR (Acrysol ™ SCT-275 - Rohm and Haas) | 9.29 |

The resulting prepaint should have a total volume of 100 gallons, total weight of 899.9 lbs., a total PVC of 0.0%, volume solids of 50.0%, weight solids of 53.2%, density of 8.99 lbs./gallon, and 10.0% coalescent on latex solids.

Example 25

This example describes the preparation of a flat acrylic prepaint by combining the following ingredients:

| Ingredient | Amount (lbs./100 gallons) |
|---|---|
| Defoamer (Drewplus ™ L-475) | 8.00 |
| Binder Acrylic (60.5% solids - Tg 16° C.) (Rhoplex ™ AC-264 - Rohm and Haas) | 773.67 |
| Coalescent (Texanol ™) | 23.40 |
| Rheology Modifier (HEUR) (Acrysol ™ RM-8W - Rohm and Haas) | 13 |
| Base - Ammonia (28%) | 0.50 |
| Solvent - Propylene Glycol | 60.00 |
| Water | 1.84 |

The resulting prepaint should have a total volume of 100 gallons, total weight of 880.4 lbs., total PVC of 0.0%, volume solids of 50.0%, weight solids of 53.2%, density of 8.80 lbs./gallon, and 5.0% coalescent on latex solids.

Example 26

This example describes the preparation of a gloss acrylic binder prepaint by combining the following ingredients:

| Ingredient | Amount (lbs./100 gallons) |
|---|---|
| Binder - Acrylic (50% solids - $T_g$ 28° C.) (Rhoplex ™ SG-10 M-Rohm and Haas) | 836.85 |
| Coalescent (Texanol ™) | 41.84 |

The resulting prepaint should have a total volume of 100 gallons, a total weight of 878.7 lbs, total PVC of 0.0%, volume solids of 44.3%, weight solids of 47.4%, density of 8.78 lbs./gallon, and 10.0% coalescent on latex solids.

Example 27

This example describes the preparation of nine exterior flat latex paints of varying quality and tone using different combinations of the white pigment prepaint of Example 14, the exterior pigment extender prepaint of Example 15, the vinyl acetate-acrylic (PVA) binder prepaint of Example 17, and the flat acrylic binder prepaint of Example 18. The paints are formulated by adding the white pigment prepaint and exterior pigment extender prepaint to the binder prepaints and mixing well.

| | | | Prepaints (wt.) | | | |
|---|---|---|---|---|---|---|
| Paint No. | PVC (%) | Volume Solids (%) | White (Ex 14) | Exterior Extender (Ex 15) | PVA Binder (Ex 17) | Flat Acrylic Binder (Ex 18) | Water (wt.) |
| 27-1 | 45.0 | 35.0 | 395.53 | 269.60 | — | 335.92 | 104.34 |
| 27-2 | 50.0 | 30.0 | 317.19 | 311.10 | — | 246.80 | 208.68 |
| 27-3 | 50.0 | 30.0 | 263.69 | 359.94 | 197.64 | 51.38 | 208.68 |
| 27-4 | 42.5 | 35.0 | 197.77 | 415.12 | — | 359.92 | 104.34 |
| 27-5 | 47.5 | 30.0 | 158.60 | 425.86 | — | 267.37 | 208.68 |
| 27-6 | 47.5 | 30.0 | 131.84 | 450.28 | 214.11 | 55.67 | 208.68 |
| 27-7 | 40.0 | 35.0 | — | 560.64 | — | 383.91 | 104.34 |
| 27-8 | 45.0 | 30.0 | — | 540.62 | — | 287.93 | 208.68 |
| 27-9 | 45.0 | 30.0 | — | 540.62 | 230.58 | 59.95 | 208.68 |

Paints 27–1, 27–4 and 27–7 are premium quality light, mid and deep tone paints; paints 27–2, 27–5 and 27–8 are first quality light, mid and deep tone paints; and paints 27–3, 27–6 and 27–9 are second quality light, mid and deep tone paints.

Example 28

This example describes the preparation of nine exterior satin latex paints of varying quality and tone using different combinations of the white pigment prepaint and exterior pigment extender prepaint of Examples 14 and 15, respectively, and the vinyl acetate/acrylic (PVA) and flat acrylic binder prepaints of Examples 17 and 18. The paints are formulated as described above.

| | | | Prepaints (wt.) | | | |
|---|---|---|---|---|---|---|
| Paint No. | PVC (%) | Volume Solids (%) | White (Ex 14) | Exterior Extender (Ex 15) | PVA Binder (Ex 17) | Flat Acrylic Binder (Ex 18) | Water (wt.) |
| 28-1 | 35.0 | 35.0 | 395.53 | 129.44 | — | 431.90 | 104.34 |
| 28-2 | 37.0 | 30.0 | 351.59 | 123.51 | — | 353.75 | 208.68 |
| 28-3 | 40.0 | 26.0 | 263.69 | 175.73 | 228.35 | 59.41 | 292.15 |
| 28-4 | 32.5 | 36.0 | 197.77 | 287.98 | — | 468.92 | 83.47 |
| 28-5 | 34.5 | 30.0 | 175.75 | 253.98 | — | 374.31 | 208.68 |
| 28-6 | 37.5 | 26.0 | 131.84 | 270.07 | 242.63 | 63.12 | 292.12 |
| 28-7 | 30.0 | 36.0 | — | 432.50 | — | 493.60 | 83.47 |
| 28-8 | 32.0 | 30.0 | — | 384.44 | — | 394.88 | 208.68 |
| 28-9 | 35.0 | 26.0 | — | 364.42 | 256.87 | 66.86 | 292.15 |

Paints 28–1, 28–4 and 28–7 are premium quality light, mid and deep tone paints; paints 28–2, 28–5 and 28–8 are first quality light, mid and deep tone paints; and paints 28–3, 28–6 and 28–9 are second quality light, mid and deep tone paints.

Example 29

This example describes the preparation of nine exterior gloss latex paints of using different combinations of the white pigment and exterior extender prepaints of Examples 14 and 15 and vinyl acetate/acrylic binder (PVA) and gloss acrylic binder prepaints of Examples 17 and 19. The paints are formulated as described above.

| | | Prepaints (wt.) | | | |
|---|---|---|---|---|---|
| Paint No. | PVC (%) | Volume Solids (%) | White (Ex 14) | PVA Binder (Ex 17) | Gloss Acrylic Binder (Ex 19) | Water (wt.) |
| 29-1 | 26.0 | 35.0 | 435.66 | — | 494.85 | 104.34 |
| 29-2 | 30.0 | 30.0 | 460.50 | — | 413.60 | 166.94 |
| 29-3 | 30.0 | 30.0 | 429.93 | 304.15 | 88.51 | 208.68 |
| 29-4 | 13.0 | 35.0 | 217.83 | — | 630.87 | 104.34 |
| 29-5 | 15.0 | 30.0 | 230.25 | — | 557.38 | 166.94 |
| 29-6 | 15.0 | 30.0 | 214.96 | 409.14 | 119.06 | 208.68 |
| 29-7 | — | 35.0 | — | — | 766.89 | 104.34 |
| 29-8 | — | 30.0 | — | — | 701.15 | 166.94 |
| 29-9 | — | 30.0 | — | 514.12 | 149.61 | 208.68 |

Paints 29–1, 29–4 and 29–7 are premium quality light, mid and deep tone paints; paints 29–2, 29–5 and 29–8 are first quality light, mid and deep tone paints; and paints 29–3, 29–6 and 29–9 are second quality light, mid and deep tone paints.

Example 30

This example describes the preparation of nine interior flat latex paints using different combinations of the white pigment and interior extender prepaints of Examples 14 and 16 and the vinyl acetate/acrylic (PVA) and flat acrylic binder prepaints of Examples 17 and 18. The paints are formulated as described above.

|  |  |  |  | Prepaints (wt.) |  |  |  |
|---|---|---|---|---|---|---|---|
| Paint No. | PVC (%) | Volume Solids (%) | White (Ex 14) | Exterior Extender (Ex 16) | PVA Binder (Ex 17) | Flat Acrylic Binder (Ex 18) | Water (wt.) |
| 30-1 | 50.0 | 30.0 | 351.59 | 273.94 | 197.64 | 51.38 | 208.68 |
| 30-2 | 60.0 | 30.0 | 263.69 | 470.21 | 166.40 | — | 208.68 |
| 30-3 | 75.0 | 25.0 | 128.02 | 620.95 | 34.67 | — | 313.02 |
| 30-4 | 47.5 | 15.0 | 175.79 | 401.73 | 214.11 | 55.67 | 208.68 |
| 30-5 | 57.5 | 30.0 | 131.84 | 558.69 | 187.20 | — | 208.68 |
| 30-6 | 72.5 | 25.0 | 64.01 | 653.67 | 52.00 | — | 313.02 |
| 30-7 | 45.0 | 30.0 | — | 529.51 | 230.58 | 59.95 | 208.68 |
| 30-8 | 55.0 | 30.0 | — | 647.18 | 208.01 | — | 208.68 |
| 30-9 | 70.0 | 25.0 | — | 686.40 | 69.34 | — | 313.02 |

Paints 30-1, 30-4 and 30-7 are premium quality light, mid and deep tone paints; paints 30-2, 30-5 and 30-8 are first quality light, mid and deep tone paints; and paints 30-3, 30-6 and 30-9 are second quality light, mid and deep tone paints.

Example 31

This example describes the preparation of nine interior satin latex paints using the white pigment and interior extender prepaints of Examples 14 and 16 and the vinyl acetate/acrylic (PVA) and flat acrylic binder prepaints of Examples 17 and 18. The paints are formulated as described above.

|  |  |  |  | Prepaints (wt.) |  |  |  |
|---|---|---|---|---|---|---|---|
| Paint No. | PVC (%) | Volume Solids (%) | White (Ex 14) | Interior Extender (Ex 16) | PVA Binder (Ex 17) | Flat Acrylic Binder (Ex 18) | Water (wt.) |
| 31-1 | 35.0 | 36.0 | 395.53 | 140.51 | 355.75 | 92.49 | 83.47 |
| 31-2 | 37.0 | 30.0 | 351.59 | 120.98 | 357.77 | — | 208.68 |
| 31-3 | 40.0 | 20.0 | 263.69 | 172.12 | 288.43 | — | 292.15 |
| 31-4 | 32.5 | 36.0 | 197.77 | 282.06 | 375.51 | 97.96 | 83.47 |
| 31-5 | 34.5 | 30.0 | 175.79 | 248.76 | 378.57 | — | 208.68 |
| 31-6 | 37.5 | 26.0 | 131.84 | 264.52 | 306.46 | — | 292.15 |
| 31-7 | 30.0 | 36.0 | — | 423.61 | 395.28 | 102.77 | 83.47 |
| 31-8 | 32.0 | 30.0 | — | 376.54 | 399.37 | — | 208.68 |
| 31-9 | 35.0 | 26.0 | — | 356.93 | 324.49 | — | 292.15 |

Paints 31-1, 31-4 and 31-7 are premium quality light, mid and deep tone paints; paints 31-2, 31-5 and 31-8 are first quality light, mid and deep tone paints; and paints 31-3, 31-6 and 31-9 are second quality light, mid and deep tone paints.

Example 32

This example describes the preparation of nine interior gloss latex paints using the white pigment prepaint of Example 14 and the vinyl acetate/acrylic (PVA) and gloss acrylic binder prepaints of Examples 17 and 19. The paints are formulated as described above.

|  |  |  |  | Prepaints (wt.) |  |  |
|---|---|---|---|---|---|---|
| Paint No. | PVC (%) | Volume Solids (%) | White (Ex 14) | PVA Binder (Ex 17) | Gloss Acrylic Binder (Ex 19) | Water (wt.) |
| 32-1 | 26.0 | 35.0 | 435.66 | — | 494.85 | 104.34 |
| 32-2 | 30.0 | 38.0 | 429.93 | 304.15 | 88.51 | 208.68 |
| 32-3 | 30.1 | 28.0 | 403.18 | 366.31 | — | 250.42 |
| 32-4 | 13.0 | 35.0 | 217.83 | — | 630.87 | 104.34 |
| 32-5 | 15.0 | 30.0 | 214.96 | 409.14 | 119.06 | 208.68 |
| 32-6 | 15.0 | 28.0 | 201.59 | 493.78 | — | 250.42 |
| 32-7 | — | 35.0 | — | — | 766.89 | 104.34 |
| 32-8 | — | 30.0 | — | 514.12 | 149.61 | 208.68 |
| 32-9 | — | 28.0 | — | 621.24 | — | 250.42 |

Paints 32-1, 32-4 and 32-7 are premium quality light, mid and deep tone paints; paints 32-2, 32-5 and 32-8 are first quality light, mid and deep tone paints; and paints 32-3, 32-6 and 32-9 are second quality light, mid and deep tone paints.

Example 33

This example describes the preparation of a latex paint useful for architectural coatings which can be prepared using the white pigment prepaint of Example 20, the exterior pigment extender of Example 22, and the flat acrylic binder prepaint of Example 25. The paint is formulated as described above.

|  |  | Prepaints (wt.) |  |  |  |
|---|---|---|---|---|---|
| PVC (%) | Paint Volume Solids (%) | White (Ex 20) | Exterior Extender (Ex 21) | Flat Acrylic Binder (Ex 24) | Water (wt.) |
| 35 | 48 | 331.27 | 294.95 | 475.42 | 33.39 |

The resulting paint should be a premium paint having a satin finish and a light tone.

Example 34

This example describes the preparation of a low solids interior flat paint using the white pigment prepaint of Example 20, the interior pigment extender of Example 23, and the vinyl acetate/acrylic (PVA) binder prepaint of Example 24.

|  | Paint | Prepaints (wt.) |  |  |  |
|---|---|---|---|---|---|
| PVC (%) | Volume Solids (%) | White (Ex 20) | Interior Extender (Ex 22) | PVA Binder (Ex 23) | Water (wt.) |
| 75 | 15 | 107.22 | 294.97 | 16.87 | 584.31 |

Example 35

This example describes the preparation of paints using the prepaints of Examples 1 to 6. The paints were prepared by mixing the pigment prepaint(s) with the binder prepaint(s), then adding the thickeners, water and colorants and mixing well. The Stormer viscosity, ICI viscosity, and pH were the equilibrated measured values.

Part A - Exterior Flat Paints (Best and Good)

| | Prepaint (lbs.) | | | | Thickener (lbs.) | | | |
| | Exterior | | | Flat | | | | |
| Paint No. | White Pigment (Ex 1) | Extender Pigment (Ex 2) | PVA Binder (Ex 4) | Acrylic Binder (Ex 6) | Acrysol SCT-275 | Acrysol RM 2020 NPR | Water (lbs.) | Colorant (lbs.) |
|---|---|---|---|---|---|---|---|---|
| 35-1[a] | 353.86 | 278.01 | — | 306.97 | 10.40 | 14.00 | 149.68 | — |
| 35-2[b] | 235.96 | 351.50 | 177.30 | 46.09 | 26.40 | 11.20 | 237.06 | — |
| 35-3[a] | — | 516.00 | — | 351.00 | 32.68 | — | 146.45 | 162 |
| 35-4[b] | — | 500.00 | 206.58 | 53.70 | 48.48 | — | 237.06 | 162 |

| | Measured Equilibrated Values | | | Calculated Properties | | | | | |
| Paint No. | Stormer Viscosity (KU) | ICI Viscosity (cp) | pH | Volume[A] (gallons) | Weight* (lbs) | PVC (%) | Volume Solids (%) | Weight Solids (%) | Density (b/gal) |
|---|---|---|---|---|---|---|---|---|---|
| 35-1[c] | 102 | 1.15 | 8.76 | 100 | 1112.92 | 45.05 | 35.08 | 50.66 | 11.13 |
| 35-2[d] | 101 | 0.87 | 8.30 | 100 | 1085.52 | 50.04 | 30.05 | 45.68 | 10.86 |
| 35-3[e] | 110 | 1.90 | 9.02 | 100 | 1046.13 | 39.94 | 35.00 | 47.92 | 10.46 |
| 35-4[f] | 121 | 1.80 | 8.70 | 100 | 1045.82 | 45.09 | 29.76 | 43.25 | 10.36 |

Part B - Exterior Satin Paint (Better)

| | Prepaint (lbs.) | | | | Thickener (lbs.) | | | |
| | Exterior | | | Flat | | | | |
| Paint No. | White Pigment (Ex 1) | Extender Pigment (Ex 2) | PVA Binder (Ex 4) | Acrylic Binder (Ex 6) | Acrysol SCT-275 | Acrysol RM 2020 NPR | Water (lbs.) | Colorant (lbs.) |
|---|---|---|---|---|---|---|---|---|
| 35-5 | 314.56 | 137.00 | — | 323.00 | 17.82 | 17.58 | 234.22 | — |

| | Measured Equilibrated Values | | | Calculated Properties | | | | | |
| Paint No. | Stormer Viscosity (KU) | ICI Viscosity (cp) | pH | Volume (gallons) | Weight (lbs) | PVC (%) | Volume Solids (%) | Weight Solids (%) | Density (b/gal) |
|---|---|---|---|---|---|---|---|---|---|
| 35-5 | 104 | 1.19 | 8.95 | 100.00 | 1044.18 | 36.94 | 29.96 | 43.26 | 10.44 |

Part C - Exterior Semigloss (Best and Good)

| | Prepaint (lbs.) | | | | Thickener (lbs.) | | | |
| | Exterior | | | Gloss | | | | |
| Paint No. | White Pigment (Ex 1) | Extender Pigment (Ex 2) | PVA Binder (Ex 4) | Acrylic Binder (Ex 5) | Acrysol SCT-275 | Acrysol RM 2020 NPR | Water (lbs.) | Colorant (lbs.) |
|---|---|---|---|---|---|---|---|---|
| 35-6[a] | 389.40 | — | — | 530.37 | — | 15.20 | 98.44 | — |
| 35-7[b] | 383.98 | — | 85.33 | 294.89 | 22.40 | 26.00 | 217.67 | — |

| | Measured Equilibrated Values | | | Calculated Properties | | | | | |
| Paint No. | Stormer Viscosity (KU) | ICI Viscosity (cp) | pH | Volume (gallons) | Weight (lbs) | PVC (%) | Volume Solids (%) | Weight Solids (%) | Density (b/gal) |
|---|---|---|---|---|---|---|---|---|---|
| 35-6[c] | 99 | 1.19 | 8.54 | 100.00 | 1033.41 | 26.00 | 35.00 | 46.91 | 10.33 |
| 35-7[d] | 102 | 1.05 | 8.20 | 100.00 | 1030.27 | 30.00 | 29.90 | 42.43 | 10.30 |

-continued

Part D - Interior Flat

| Paint No. | Prepaint (lbs.) | | | | Thickener (lbs.) | | Water (lbs.) | Colorant (lbs.) |
|---|---|---|---|---|---|---|---|---|
| | Interior | | | Flat | | | | |
| | White Pigment (Ex 1) | Extender Pigment (Ex 3) | PVA Binder (Ex 4) | Acrylic Binder (Ex 5) | Acrysol SCT-275 | Acrysol RM 2020 NPR | | |
| 35-8[a] | 314.56 | 280.69 | 177.31 | 46.09 | 24.00 | 20.80 | 230.22 | — |
| 35-9 | 115.95 | 590.05 | 30.04 | — | 34.60 | — | 336.19 | — |
| 35-10[a] | — | 496.07 | 206.55 | 53.67 | 41.92 | — | 236.60 | 162 |
| 35-11 | — | 643.99 | 62.04 | — | 51.36 | — | 320.17 | 162 |

| Paint No. | Measured Equilibrated Values | | | Calculated Properties | | | | | |
|---|---|---|---|---|---|---|---|---|---|
| | Stormer Viscosity (KU) | ICI Viscosity (cp) | pH | Volume (gallons) | Weight (lbs) | PVC (%) | Volume Solids (%) | Weight Solids (%) | Density (b/gal) |
| 35-8 | 99 | 1.05 | 8.45 | 100.00 | 1093.67 | 50.00 | 30.00 | 45.88 | 10.94 |
| 35-9 | 84 | 0.70 | 8.50 | 100.00 | 1106.83 | 75.15 | 24.99 | 43.08 | 11.07 |
| 35-10 | 120 | 1.90 | 8.60 | 100.00 | 1034.81 | 45.04 | 29.99 | 43.36 | 10.35 |
| 35-11 | 108 | 1.88 | 8.80 | 100.00 | 1077.56 | 70.00 | 25.05 | 41.74 | 10.78 |

[a]Best light tone and deep tone paints
[b]Good light tone and deep tone paints
[c]There was 0.44% dispersant based on dry pigment and 7.48% coalescent based on dry polymer.
[d]There was 0.46% dispersant based on dry pigment and 7.40% coalescent based on dry polymer.
[e]There was 0.50% dispersant based on dry pigment and 7.00% coalescent based on dry polymer.
[f]There was 0.50% dispersant based on dry pigment and 7.00% coalescent based on dry polymer.
There was 0.43% dispersant based on dry pigment and 7.43% coalescent based on dry polymer.
[a]Best
[b]Good
[c]There was a 0.40% dispersant based on dry pigment solids and a 10.00% coalescent base on dry polymer
[d]There was a 0.40% dispersant based on dry pigment solids and a 7.97% coalescent base on dry polymer
[a]Paints 35-8 and 35-10 were best light and deep tone paints.
Paints 35-9 and 35-11 were good light and deep tone paints.

The percentage dispersant on dry pigment was 0.45%, 0.48%, 0.50%, and 0.50% for paint nos. 34-8 to 34-11, respectively. The percentages of Coalescent was 7.53%, 47%, 7.00% and 7.00% for paint nos. 34-8 to 34-11, respectively.

Part E - Interior Satin Paint

| Paint No. | Prepaint (lbs.) | | | | Thickener (lbs.) | | Water (lbs.) | Colorant (lbs.) |
|---|---|---|---|---|---|---|---|---|
| | Interior | | | Flat | | | | |
| | White Pigment (Ex 1) | Extender Pigment (Ex 3) | PVA Binder (Ex 4) | Acrylic Binder (Ex 5) | Acrysol SCT-275 | Acrysol RM 2020 NPR | | |
| 35-12 | 314.56 | 138.00 | 319.00 | — | 24.96 | 21.40 | 229.76 | — |

The paint was a better light tone paint.

| Paint No. | Measured Equilibrated Values | | | Calculated Properties | | | | | |
|---|---|---|---|---|---|---|---|---|---|
| | Stormer Viscosity (KU) | ICI Viscosity (cp) | pH | Volume (gallons) | Weight (lbs) | PVC (%) | Volume Solids (%) | Weight Solids (%) | Density (b/gal) |
| 35-12 | 93 | 0.91 | 8.37 | 100.00 | 1047.68 | 37.05 | 29.99 | 43.54 | 10.48 |

The dispersant in dry pigment was 0.43%.
The coalescent in dry polymer was 7.42%.

Part F - Semi-Gloss Paint

| Paint No. | Prepaint (lbs.) | | | | Thickener (lbs.) | | Water (lbs.) | Colorant (lbs.) |
|---|---|---|---|---|---|---|---|---|
| | Interior | | | Gloss | | | | |
| | White Pigment (Ex 1) | Extender Pigment (Ex 3) | PVA Binder (Ex 4) | Acrylic Binder (Ex 6) | Acrysol SCT-275 | Acrysol RM 2020 NPR | | |
| 35-13 | 383.98 | — | 294.89 | 85.33 | 22.40 | 26.00 | 217.67 | — |
| 35-14 | 359.89 | — | 347.58 | — | 28.80 | 28.00 | 255.70 | — |

Paint nos. 35–13 were better and good light tone paints.

| | Measured Equilibrated Values | | | Calculated Properties | | | | | |
|---|---|---|---|---|---|---|---|---|---|
| Paint No. | Stormer Viscosity (KU) | ICI Viscosity (cp) | pH | Volume (gallons) | Weight (lbs) | PVC (%) | Volume Solids (%) | Weight Solids (%) | Density (b/gal) |
| 35-13 | 102 | 1.05 | 8.20 | 100.00 | 1030.27 | 30.01 | 29.91 | 42.43 | 10.30 |
| 35-14 | 101 | 1.19 | 7.90 | 100.00 | 1019.97 | 30.02 | 28.02 | 40.22 | 10.20 |

The dispersant was 0.40% on dry pigment for paints 35–13 and 35–14.
The coalescents were 7.97% and 7.47%, respectively for paints 35–13 and 35–14.

Example 36

This example describes the preparation of a white opacifying pigment prepaint for use in an elastomeric coating. The prepaint is prepared by combining the following ingredients:

| Ingredient | Amount (lbs./100 gal.) |
|---|---|
| Binder Acrylic (50.5% solids, $T_g$ = −16° C. Rhoplex ® 2438 - Rohm and Haas) | 177.11 |
| Water | 257.90 |
| Dispersant (Tamol ® 165A - Rohm and Haas) | 49.24 |
| Defoamer (Nopco NXZ) | 12.44 |
| Base - Ammonia (28%) | 3.94 |
| Coalescent (Texanol) | 2.68 |
| Rheology Modifier (Acrysol ® SCT-275) | 5.00 |
| Pigment - Titanium Dioxide (Ti-Pure R-960 - DuPont) | 1292.48 |

The prepaint is prepared using a high speed disperser. The water, dispersant, acrylic binder, defoamer, base, and rheology modifier are combined and mixed briefly at low speed and the dry pigment is added. After all the dry pigment is added, the mixture should be dispersed at high speed, for 15–20 minutes as is known to those skilled in the art.

The resulting prepaint should have has a total volume of 100 gallons, a total weight of 1,800.80 lbs., a total PVC of 80.00%, a volume solids of 50.00%, a weight solids of 76.74%, a density of 18.008 lbs./gal., 0.80% dispersant on pigment solids, and 3.0% coalescent on latex solids.

Example 37

This example describes the preparation of a white opacifying pigment prepaint containing zinc oxide for use in an elastomeric coating. The prepaint is prepared as above by combining the following ingredients:

| Ingredient | Amount (lbs./100 gal.) |
|---|---|
| Binder Acrylic (50.5% solids, $T_g$ = −16° C. Rhoplex ® 2438 - Rohm and Haas) | 177.11 |
| Water | 278.10 |
| Dispersant (Tamol ® 2001 - Rohm and Haas) | 26.99 |
| Surfactant (Triton ® X-405 - Union Carbide) | 10.00 |
| Defoamer (Nopco NXZ) | 5.00 |
| Base - Ammonia (28%) | 3.94 |
| Coalescent (Texanol) | 2.68 |
| Rheology Modifier (Acrysol ® SCT-275) | 5.00 |
| Pigment - Zinc Oxide (XX-503 - Zinc Corporation of America) | 283.26 |
| Pigment - Titanium Dioxide (Ti-Pure R-706 - DuPont) | 1133.50 |

The resulting prepaint should have a total volume of 100 gallons, a total weight of 1,925.58 lbs., a total PVC of 80.00%, a titanium dioxide PVC of 67.90%, a volume solids of 50.00%, a weight solids of 78.22%, a density of 19.2558 lbs./gal., 0.80% dispersant on pigment solids, and 3.0% coalescent on latex solids.

Example 38

This example describes the preparation of an extender pigment prepaint for use in an elastomeric coating. The prepaint is prepared as above by combining the following ingredients:

| Ingredient | Amount (lbs./100 gal.) |
| --- | --- |
| Water | 295.80 |
| Dispersant (Tamol ™ 731A - Rohm and Haas) | 10.82 |
| Defoamer (Nopco ™ NXZ) | 13.36 |
| Base - Ammonia (28%) | 6.68 |
| Coalescent (Texanol ™) | 1.79 |
| Rheology Modifier (Natrosol 250 HR) | 1.00 |
| Binder Acrylic (50.5% solids, Tg = −16° C., Rhoplex ™ 2438 - Rohm and Haas) | 177.11 |
| Pigment - Calcium Carbonate (Duramite ™) | 901.50 |

The resulting prepaint should have a total volume of 100 gallons, a total weight of 1,408.05 lbs., a total PVC of 80.00%, a volume solids of 50.00%, a weight solids of 70.38%, a density of 14.0805 lbs./gal., 0.30% dispersant on pigment solids, and 2.0% coalescent on latex solids.

Example 39

This example describes the preparation of a low $T_g$ acrylic binder prepaint with good low temperature flexibility. The prepaint is prepared using a laboratory mixer having a 45° pitch stirring blade.

| Ingredient | Amount (lbs./100 gal.) |
| --- | --- |
| Binder Acrylic (50.5% solids, Tg = −16° C. Rhoplex ® 2438 - Rohm and Haas) | 814.71 |
| Defoamer (Nopco NXZ) | 1.33 |
| Rheology Modifier (Natrosol 250 HR) | 5.32 |
| Solvent - Propylene Glycol | 26.62 |
| Base - Ammonia (28%) | 2.66 |
| Coalescent (Texanol) | 8.23 |
| Water | 6.06 |

The resulting prepaint should have as a total volume of 100 gallons, a total weight of 864.93 lbs., a volume solids of 46.00%, a weight solids of 47.57%, a density of 8.6493 lbs./gal., and 2.0% coalescent on latex solids.

Example 40

This example describes the preparation of a mid-range $T_g$ stryene/acrylic binder prepaint with low temperature flexibility only down to −5° C. The pigment is prepared using a laboratory mixer having a 45° pitch stirring blade.

| Ingredient | Amount (lbs./100 gal.) |
| --- | --- |
| Binder Styrene/Acrylic (55.0% solids, Tg = −5° C. Rhoplex ® 2019R - Rohm and Haas) | 803.91 |
| Defoamer (Nopco NXZ) | 1.33 |
| Rheology Modifier (Natrosol 250 HR) | 5.32 |
| Solvent - Propylene Glycol | 26.62 |
| Base - Ammonia (28%) | 2.66 |
| Coalescent (Texanol) | 8.84 |
| Water | 10.99 |

The resulting prepaint should have a total volume of 100 gallons, a total weight of 859.69 lbs., a volume solids of 50.00%, a weight solids of 51.43%, a density of 8.5969 lbs./gal., and 2.0% coalescent on latex solids.

Example 41

This example describes the preparation of a high $T_g$ (14° C.) 100% acrylic binder prepaint with poor low temperature flexibility. The pigment is prepared using a laboratory mixer having a 45° pitch stirring blade.

| Ingredient | Amount (lbs./100 gal.) |
| --- | --- |
| Binder Acrylic (53.5% solids, Tg = 14° C. Multilobe ™ 200 - Rohm and Haas) | 822.40 |
| Defoamer (Nopco NXZ) | 1.33 |
| Rheology Modifier (Natrosol 250 HR) | 5.32 |
| Solvent - Propylene Glycol | 26.62 |
| Base - Ammonia (28%) | 2.66 |
| Coalescent (Texanol) | 26.40 |
| Water | 0.36 |

The resulting prepaint should have a total volume of 100 gallons, a total weight of 885.11 lbs., a volume solids of 47.00%, a weight solids of 49.71%, a density of 8.8511 lbs./gal., and 6.0% coalescent on latex solids.

Example 42

This example describes the preparation of 11 elastomeric wall coating formulations of varying quality and mildew resistance using different combinations of the white pigment prepaints of Examples 36 and 37, the extender prepaints of Example 38, and the binder prepaints of Examples 39, 40 and 41. The paints are formulated by adding the white pigment prepaint and extender prepaint to the binder prepaints and mixing well.

Table 1: The prepaint amounts mixed together are those given below. All weights are in lbs., the total volume of each elastomeric coating is 100 gallons, formulated to 45% volume solids.

| | Weight of Example Prepaints | | | | | | | |
| --- | --- | --- | --- | --- | --- | --- | --- | --- |
| Paint | 36 | 37 | 38 | 39 | 40 | 41 | Water | Total |
| 42-1 | 70.9 | 0.0 | 419.8 | 528.8 | 0.0 | 0.0 | 42.4 | 1061.9 |
| 42-2 | 0.0 | 89.3 | 409.9 | 528.8 | 0.0 | 0.0 | 42.4 | 1070.5 |
| 42-3 | 70.9 | 0.0 | 657.4 | 370.2 | 0.0 | 0.0 | 54.6 | 1153.1 |
| 42-4 | 0.0 | 89.3 | 647.5 | 370.2 | 0.0 | 0.0 | 54.6 | 1161.6 |
| 42-5 | 131.7 | 0.0 | 372.3 | 528.8 | 0.0 | 0.0 | 42.4 | 1075.2 |
| 42-6 | 0.0 | 165.9 | 353.9 | 528.8 | 0.0 | 0.0 | 42.4 | 1091.0 |
| 42-7 | 131.7 | 0.0 | 609.9 | 370.2 | 0.0 | 0.0 | 54.6 | 1166.3 |
| 42-8 | 0.0 | 165.9 | 591.5 | 370.2 | 0.0 | 0.0 | 54.6 | 1182.2 |
| 42-9 | 70.9 | 0.0 | 419.8 | 0.0 | 483.6 | 0.0 | 83.0 | 1057.3 |
| 42-10 | 0.0 | 89.3 | 647.5 | 0.0 | 338.5 | 0.0 | 83.0 | 1158.3 |
| 42-11 | 70.9 | 0.0 | 657.4 | 227.5 | 0.0 | 141.6 | 58.7 | 1014.5 |

TABLE 2

The expected PVC, TiO2 level, low temperature flexibility, and quality of the resulting elastomeric coatings are shown below.

| Paint | PVC | ZnO presence | TiO$_2$ PVC | Flex | Quality |
| --- | --- | --- | --- | --- | --- |
| 42-1 | 30 | no | 3.5 | 0° F. | medium |
| 42-2 | 30 | yes | 3.5 | 0° F. | medium |
| 42-3 | 45 | no | 3.5 | 0° F. | low |
| 42-4 | 45 | yes | 3.5 | 0° F. | low |
| 42-5 | 30 | no | 6.5 | 0° F. | high |
| 42-6 | 30 | yes | 6.5 | 0° F. | high |
| 42-7 | 45 | no | 6.5 | 0° F. | medium |
| 42-8 | 45 | yes | 6.5 | 0° F. | medium |
| 42-9 | 30 | no | 3.5 | 20° F. | medium |
| 42-10 | 45 | yes | 3.5 | 20° F. | low |
| 42-11 | 45 | no | 3.5 | 40° F. | poor |

The elastomeric coating preparations shown above represent a range of qualities that depend upon the durability and the flexibility at low temperature. These examples are not intended to be limiting. For instance, all the pigment and extender prepaints can be formulated with or without binders, and the binders may have a higher $T_g$ than the one used in these examples. In addition, the extender prepaint is not meant to limited to the use of calcium carbonate, but to show an example that could also include other commonly used extenders such as, clays, silicas, magnesium silicates, and the like.

Elastomeric coatings for use for roofs can be differentiated in the same manner as for elastomeric coatings for walls, with two additional variations, the use of functional extenders such as aluminum trihydrate to promote flame retardancy, and enhanced adhesion to specific roofing substrates. The examples that follow are intended to show the capabilities of the prepaint concept when applied to elastomeric roof coatings, and are not intended to limit.

Example 43

This example describes the preparation of a white pigment prepaint which is prepared by combining the following ingredients:

| Ingredient | Amount (lbs./100 gal.) |
|---|---|
| Binder Acrylic (55.0% solids, Tg = −29° C. Rhoplex ® EC-1791 - Rohm and Haas) | 159.75 |
| Water | 268.95 |
| Dispersant (Tamol ® 165A - Rohm and Haas) | 49.24 |
| Defoamer (Nopco NXZ) | 12.44 |
| Base - Ammonia (28%) | 3.94 |
| Coalescent (Texanol) | 2.64 |
| Rheology Modifier (Acrysol ® SCT-275) | 10.00 |
| Pigment - Titanium Dioxide (Ti-Pure R-960 - DuPont) | 1292.48 |

The prepaint is prepared using a high speed disperser. The water, dispersant, acrylic binder, defoamer, base, and rheology modifier are combined and mixed at briefly low speed and then the dry pigment is added. After all the dry pigment is added, the mixture can be dispersed at high speed, for 15–20 minutes as is known to those skilled in the art.

The resulting prepaint should have a total volume of 100 gallons, a total weight of 1,799.45 lbs., a total PVC of 80.00%, a volume solids of 50.00%, a weight solids of 76.71%, a density of 17.9945 lbs./gal., 0.80% dispersant on pigment solids, and 3.0% coalescent on latex solids.

Example 44

This example describes the preparation of a white opacifying prepaint for use in preparing coatings which have good adhesion to asphaltic roofing materials. The prepaint is prepared by combining the following ingredients:

| Ingredient | Amount (lbs./100 gal.) |
|---|---|
| Binder Acrylic (55.0% solids, Tg = −8° C. Lipacryl ® MB-3640 - Rohm and Haas) | 160.69 |
| Water | 268.12 |
| Dispersant (Tamol ® 165A - Rohm and Haas) | 49.24 |
| Defoamer (Nopco NXZ) | 12.44 |
| Base - Ammonia (28%) | 3.94 |

-continued

| Ingredient | Amount (lbs./100 gal.) |
|---|---|
| Coalescent (Texanol) | 2.65 |
| Rheology Modifier (Acrysol ® SCT-275) | 10.00 |
| Pigment - Titanium Dioxide (Ti-Pure R-960 - DuPont) | 1292.48 |

The prepaint is prepared using a high speed disperser, as illustrated in Example 43. The resulting prepaint should have a total volume of 100 gallons, a total weight of 1,799.56 lbs., a total PVC of 80.00%, a volume solids of 50.00%, a weight solids of 76.73%, a density of 17.9956 lbs./gal., 0.80% dispersant on pigment solids, and 3.0% coalescent on latex solids. This prepaint is designed to work best in coatings used for asphaltic substrates.

Example 45

This example describes the preparation of a white opacifying prepaint containing zinc oxide. The prepaint is prepared as above by combining the following ingredients:

| Ingredient | Amount (lbs./100 gal.) |
|---|---|
| Binder Acrylic (55.0% solids, Tg = −29° C. Rhoplex ® BC-1791 - Rohm and Haas) | 159.75 |
| Water | 272.67 |
| Dispersant (Tamol ® 731A - Rohm and Haas) | 44.09 |
| Surfactant (Triton ® X-405 - Union Carbide) | 10.00 |
| Defoamer (Nopco NXZ) | 5.00 |
| Base - Ammonia (28%) | 3.94 |
| Coalescent (Texanol) | 2.64 |
| Rheology Modifier (Acrysol ® SCT-275) | 12.00 |
| Pigment - Zinc Oxide (XX-503 - Zinc Corporation of America) | 275.47 |
| Pigment - Titanium Dioxide (Ti-Pure R-960 - DuPont) | 1102.32 |

The resulting prepaint should have a total volume of 100 gallons, a total weight of 1,887.88 lbs., a total PVC of 80.00%, a titanium oxide PVC of 68.23%, a volume solids of 50.00%, a weight solids of 77.63%, a density of 18.8788 lbs./gal., 0.80% dispersant on pigment solids, and 3.0% coalescent on latex solids.

Example 46

This example describes the preparation of an extender pigment prepaint. The prepaint is prepared as above by combining the following ingredients:

| Ingredient | Amount (lbs./100 gal.) |
|---|---|
| Water | 310.92 |
| Dispersant (Tamol 731A - Rohm and Haas) | 10.82 |
| Defoamer (Nopco NXZ) | 13.36 |
| Base - Ammonia (28%) | 6.68 |
| Coalescent (Texanol) | 1.76 |
| Rheology Modifier (Natrosol 2501 HR) | 2.00 |
| Binder Acrylic (55.0% solids, Tg = −29° C., Rhoplex ® EC-1791 - Rohm and Haas) | 159.75 |
| Pigment - Calcium Carbonate (Duramite) | 901.50 |

The resulting prepaint should have a total volume of 100 gallons, a total weight of 1,406.78 lbs., a total PVC of 80.00%, a volume solids of 50.00%, a weight solids of 70.33%, a density of 14.0678 lbs./gal., 0.30% dispersant on pigment solids, and 2.0% coalescent on latex solids.

Example 47

This example describes the preparation of an extender pigment prepaint for use in preparing coatings which have good adhesion to asphalt roofing materials. The prepaint is prepared as above by combining the following ingredients:

| Ingredient | Amount (lbs./100 gal.) |
| --- | --- |
| Water | 310.09 |
| Dispersant (Tamol 731A - Rohm and Haas) | 10.82 |
| Defoamer (Nopco NXZ) | 13.36 |
| Base - Ammonia (28%) | 6.68 |
| Coalescent (Texanol) | 1.77 |
| Rheology Modifier (Natrosol 250 HR) | 2.00 |
| Binder Acrylic (55.0% solids, Tg = −8° C., Lipacryl ® MB-3640 - Rohm and Haas) | 160.69 |
| Pigment - Calcium Carbonate (Duramite) | 901.50 |

The resulting prepaint should have a total volume of 100 gallons, a total weight of 1,406.90 lbs., a total PVC of 80.00%, a volume solids of 50.00%, a weight solids of 70.36%, a density of 14.0690 lbs./gal., 0.30% dispersant on pigment solids, and 2.0% coalescent on latex solids.

Example 48

This example describes the preparation of an extender pigment prepaint using aluminum trihydrate which is known to impart flame retardant properties. It is prepared as described above by combining the following ingredients:

| Ingredient | Amount (lbs./100 gal.) |
| --- | --- |
| Water | 311.61 |
| Dispersant (Tamol 731A - Rohm and Haas) | 9.70 |
| Defoamer (Nopco NXZ) | 13.36 |
| Base - Ammonia (28%) | 6.68 |
| Coalescent (Texanol) | 1.76 |
| Rheology Modifier (Natrosol 250 HR) | 2.00 |
| Binder Acrylic (55.0% solids, $T_g$ = −29° C., Rhoplex ® EC-1791 - Rohm and Haas) | 159.75 |
| Pigment - Aluminum Trihydrate (Solem SB-432 Huber) | 807.94 |

The resulting prepaint should have a total volume of 100 gallons, a total weight of 1,312.79 lbs., a total PVC of 80.00%, a volume solids of 50.00%, a weight solids of 68.24%, a density of 13.1279 lbs./gal., 0.30% dispersant on pigment solids, and 2.0% coalescent on latex solids.

Example 49

This example describes the preparation of low $T_g$ acrylic binder prepaint which should have with good low temperature flexibility and good adhesion to a variety of roofing substrates. The paint is prepared using a laboratory mixer having a 45% pitching blade.

| Ingredient | Amount (lbs./100 gal.) |
| --- | --- |
| Binder Acrylic (55.0% solids, $T_g$ = 29° C. Rhoplex ® EC-1791 - Rohm and Haas) | 798.75 |
| Defoamer Nopco NXZ) | 1.33 |
| Rheology Modifier (Natrosol 250 HR) | 5.32 |
| Solvent - Propylene Glycol | 26.62 |
| Base - Ammonia (28%) | 2.66 |
| Coalescent (Texanol) | 8.79 |
| Water | 16.45 |

The resulting prepaint should have a total volume of 100 gallons, a total weight of 859.93 lbs., a volume solids of 50.00%, a weight solids of 51.09%, a density of 8.5993 lbs./gal., and 2.0% coalescent on latex solids.

Example 50

This example describes the preparation of a mid-range $T_g$ acrylic binder prepaint which should have good adhesion to asphalt roofing materials. The prepaint is prepared using a laboratory mixer having a 45° pitch stirring blade.

| Ingredient | Amount (lbs./100 gal.) |
| --- | --- |
| Binder Acrylic (55.0% solids, Tg = −8° C. Lipacryl ® MB-3640 - Rohm and Haas) | 803.45 |
| Defoamer (Nopco NXZ) | 1.33 |
| Rheology Modifier (Natrosol 250 HR) | 5.32 |
| Solvent - Propylene Glycol | 26.62 |
| Base - Ammonia (28%) | 2.66 |
| Coalescent (Texanol) | 8.84 |
| Water | 12.29 |

The resulting prepaint should have a total volume of 100 gallons, a total weight of 860.52 lbs., a volume solids of 50.00%, a weight solids of 51.35%, a density of 8.6052 lbs./gal., and 2.0% coalescent on latex solids.

Example 51

This example describes the preparation of a tan pigment prepaint with zinc oxide. The prepaint is prepared as in example 46 by combining the following ingredients.

| Ingredient | Amount (lbs./100 gal.) |
|---|---|
| Binder Acrylic (55.0% solids, Tg = −29° C. Rhoplex ® EC-1791 - Rohm and Haas) | 143.78 |
| Water | 307.35 |
| Dispersant (Tamol ® 731A - Rohm and Haas) | 30.07 |
| Surfactant (Triton ® X-405 - Union Carbide) | 10.00 |
| Defoamer (Nopco NXZ) | 5.00 |
| Base - Ammonia (28%) | 3.94 |
| Coalescent (Texanol) | 2.37 |
| Rheology Modifier (Acrysol ® SCT-275) | 40.00 |
| Pigment - Zinc Oxide (XX-503 - Zinc Corporation of America) | 480.33 |
| Pigment - Tan Iron Oxide (Mapico 422) | 1023.06 |

The resulting prepaint should have a total volume of 100 gallons, a total weight of 2,045.89 lbs., a total PVC of 80.00%, a volume solids of 45.00%, a weight solids of 77.35%, a density of 20.4589 lbs./gal., 0.50% dispersant on pigment solids, and 3.0% coalescent on latex solids.

Example 52

This example describes the preparation of an extender pigment prepaint using crystalline silica. Silica extenders are known to provide good durability and abrasion resistance. The prepaint is prepared as above by combining the following ingredients:

| Ingredient | Amount (lbs./100 gal.) |
|---|---|
| Water | 296.22 |
| Dispersant (Tamol ® 731A - Rohm and Haas) | 26.54 |
| Defoamer (Nopco NXZ) | 13.36 |
| Base - Ammonia (28%) | 6.68 |
| Coalescent (Texanol) | 1.76 |
| Thickener (Natrosol 250 HR) | 2.00 |
| Binder Acrylic (55.0% solids, Tg = −29° C. Rhoplex ® EC-1791 - Rohm and Haas) | 159.75 |
| Silica Extender (Silver Bond B) | 884.81 |

The resulting prepaint should have a total volume of 100 gallons, a total weight of 1,391.11 lbs., a total PVC of 80.00%, a volume solids of 50.00%, a weight solids of 69.92%, a density of 13.9111 lbs./gal., 0.75% dispersant on pigment solids, and 2.0% coalescent on latex solids.

Example 53

This example describes the preparation of 15 elastomeric roof coating formulations of varying quality, flexibility, adhesion and flame retardancy. The coatings are formulated using different combinations of the white prepaints of Examples 43, 44, and 45, the non-white pigment prepaint of Example 16, the extender prepaints of Examples 46, 47, 48, and 52 and the binder prepaints of Example 40, 49 and 50. The paints are formulated by adding the pigment prepaint and extender prepaint to the binder prepaints and mixing well. The amounts mixed are those cited below. All weights are in lbs., and the total volume of each elastomeric coating is 100 gallons. The volume solids is 45%.

| | Weight of example prepaints | | | | | | | | | | | | |
|---|---|---|---|---|---|---|---|---|---|---|---|---|---|
| Paint | 43 | 44 | 45 | 51 | 46 | 47 | 48 | 52 | 40 | 49 | 50 | Water | Total |
| 53-1 | 70.9 | — | — | — | 419.4 | — | — | — | — | 483.7 | — | 83 | 1057.0 |
| 53-2 | — | — | 87.2 | — | 409.8 | — | — | — | — | 483.7 | — | 83 | 1063.7 |
| 53-3 | 70.9 | — | — | — | 656.8 | — | — | — | — | 338.6 | — | 83 | 1149.2 |
| 53-4 | — | — | 87.2 | — | 647.2 | — | — | — | — | 338.6 | — | 83 | 1156.0 |
| 53-5 | 131.6 | — | — | — | 371.9 | — | — | — | — | 483.7 | — | 83 | 1070.2 |
| 53-6 | — | — | 161.9 | — | 354.2 | — | — | — | — | 483.7 | — | 83 | 1082.7 |
| 53-7 | 131.6 | — | — | — | 609.3 | — | — | — | — | 338.6 | — | 83 | 1162.5 |
| 53-8 | — | — | 161.9 | — | 591.6 | — | — | — | — | 338.6 | — | 83 | 1175.0 |
| 53-9 | 70.9 | — | — | — | — | 391.4 | — | — | — | 483.7 | — | 83 | 1028.9 |
| 53-10 | — | — | 88.9 | — | — | 647.8 | — | — | — | 338.5 | — | 83 | 1158.2 |
| 53-11 | 91.1 | — | — | — | 403.6 | — | — | — | 483.6 | — | — | 83 | 1061.2 |
| 53-12 | — | — | 112.1 | — | 628.7 | — | — | — | 338.5 | — | — | 83 | 1162.2 |
| 53-13 | — | 131.6 | — | — | — | 530.2 | — | — | — | — | 387.2 | 83 | 1132.1 |
| 53-14 | 131.6 | — | — | — | 530.2 | — | — | — | 387.2 | — | — | 83 | 1132.0 |
| 53-15 | — | — | — | 179.0 | — | — | — | 548.0 | — | 368.0 | — | 76 | 1171.0 |

The expected PVC, TiO2 level, low temperature flexibility, extender type, and presence of special adhesion, and quality of the resulting elastomeric coating mixtures are shown in Table 3

| Paint | PVC | ZnO | TiO2 | PVC | Color | Extender | Flex Temp | Special adhesion | Quality |
|---|---|---|---|---|---|---|---|---|---|
| 53-1 | 30 | no | 3.5 | | white | CaCO3 | −15° F. | variety | medium |
| 53-2 | 30 | yes | 3.5 | | white | CaCO3 | −15° F. | variety | medium |
| 53-4 3 | 45 | no | 3.5 | | white | CaCO3 | 15° F. | variety | low |
| 53-4 | 45 | yes | 3.5 | | white | CaCO3 | −15° F. | variety | low |
| 53-5 | 30 | no | 6.5 | | white | CaCO3 | −15° F. | variety | high |
| 53-6 | 30 | yes | 6.5 | | white | CaCO3 | −15° F. | variety | high |
| 53-7 | 45 | no | 6.5 | | white | CaCO3 | −15° F. 15° F. | variety | medium |
| 53-8 | 45 | yes | 6.5 | | white | CaCO3 | −15° F. | variety | medium |
| 53-9 | 30 | no | 3.5 | | white | ATH | −15° F. | variety | medium |
| 53-10 | 45 | yes | 3.5 | | white | ATH | −15° F. | variety | low |
| 53-11 | 30 | no | 4.5 | | white | CaCO3 | 20° F. | variety | medium |
| 53-12 | 45 | yes | 4.5 | | white | CaCO3 | 20° F. | variety | low |
| 53-13 | 40 | no | 6.5 | | white | CaCO3 | 20° F. | asphalt | medium |
| 53-14 | 40 | no | 6.5 | | white | CaCO3 | 20° F. | asphalt blend | medium |
| 53-15 | 42 | yes | 0 | | tan | silica | −15° F. | variety | medium |

The elastomeric coating preparations shown above represent a range of qualities that depend upon the durability and the flexibility of the coating at low temperature. Different extender prepaints are used to promote flame retardancy in the dried coatings. Included are prepaints prepared using dry ground colorants and no $TiO_2$ to develop tinted paints. These examples are not intended to be limiting. For instance, all the pigment and extender prepaints can be formulated with or without binders, and the binders may have a higher $T_g$ than the one used in the our example. In addition, the extender prepaint is not meant to limit use to calcium carbonate, but to show an example that could also include other commonly used extenders such as, clays, silicas, magnesium silicates, etc.

Example 54

This example describes the preparation of a white pigment prepaint/preformulated component.

| Ingredient | Amount (lbs./100 gal.) |
|---|---|
| Water | 275.83 |
| Solvent - Propylene Glycol | 50.00 |
| Dispersant (Tamol ® 731A - Rohm and Haas) | 26.71 |
| Defoamer (Nopco NXZ) | 1.50 |
| Surfactant (Triton CF-10) | 1.00 |
| Pigment - Titanium Dioxide (Ti-Pure R-902 - DuPont) | 1335.56 |
| Base (Ammonia - 28%) | 4.00 |
| Defoamer (Nopco NXZ) | 1.50 |
| Thickener (Acrysol ® RM-2020 NPR - Rohm and Haas) | 50.00 |
| Water | 93.45 |

The water, glycol, defoamer, dispersant and surfactant are combined and mixed briefly at low speed. The dry pigment is then added. After all the dry pigment is added, the mixture is mixed at high shear for 15–20 minutes as is known to those skilled in the art.

The resulting white pigment prepaint/preformulation should have a total volume of 100 gallons, a total weight of 1,839.55 lbs., a total PVC of 100.00%, a volume solids of 40.12%, a weight solids of 72.60%, a density of 18.4495 lbs./gal., and 0.50% dispersant on pigment solids.

Example 55

This example describes the preparation of a small particle size extender prepaint/preformulated component:

| Ingredient | (lbs./100 gal.) |
|---|---|
| Binder Acrylic (46.5% solids, Tg = 17° C. Rhoplex ® EI-2000 - Rohm and Haas) | 201.32 |
| Solvent - Propylene Glycol | 5.00 |
| Dispersant (Tamol ® 731A - Rohm and Haas) | 10.42 |
| Defoamer (Nopco NXZ) | 2.00 |
| Thickener #1 (Attagel 50) | 27.96 |
| Small particle size extender (Minex 4) | 840.53 |
| Coalescent (Texanol) | 3.28 |
| Base (Ammonia - 28%) | 2.00 |
| Water | 283.42 |
| Thickener #2 (Acrysol ® ASE-60 - Rohm and Haas) | 4.00 |

The water, acrylic binder, defoamer, base, and glycol are combined and mixed briefly at low speed. The dry extender is then added. After all the dry extender is added, the mixture is mixed at high shear for 15–20 minutes as is known to those skilled in the art.

The resulting small particle size extender prepaint/preformulation should have a total volume of 100 gallons, a total weight of 1,379.93 lbs., a total PVC of 80.00%, a volume solids of 50.00%, a weight solids of 69.72%, a density of 13.7993 lbs./gal., 0.30% dispersant on pigment solids, and 3.50% coalescent on latex solids.

Example 56

This example describes the preparation of a binder prepaint/preformulation. It is prepared using a laboratory mixer having a 45° pitch stirring blade.

| Ingredient | Amount (lbs./100 gal.) |
|---|---|
| Binder Acrylic (46.5% solids, Tg = 17° C. Rhoplex ® EI-2000 - Rohm and Haas) | 805.28 |
| Defoamer (Nopco NXZ) | 1.33 |
| Thickener (Acrysol ® ASE-60 - Rohm and Haas) | 20.00 |
| Solvent - Propylene Glycol | 10.00 |

-continued

| Ingredient | Amount (lbs./100 gal.) |
|---|---|
| Base - Ammonia (28%) | 2.66 |
| Coalescent (Texanol) | 13.11 |
| Water | 21.92 |

The resulting binder prepaint/preformulation package should have a total volume of 100 gallons, a total weight of 874.31 lbs., a volume solids of 40.00%, a weight solids of 42.83%, a density of 8.7431 lbs./gal., and 3.50% coalescent on latex solids.

Example 57

This example describes the preparation of binder prepaint/preformulation for good low temperature flexibility. It is prepared using a laboratory mixer having a 45° pitch stirring blade.

| Ingredient | Amount (lbs./100 gal.) |
|---|---|
| Binder Acrylic (61% solids, Tg = −29° C. Rhoplex ® EC-2848 - Rohm and Haas) | 584.20 |
| Defoamer (Nopco NXZ) | 1.33 |
| Thickener (Acrysol ® ASE-60 - Rohm and Haas) | 20.00 |
| Solvent - Propylene Glycol | 10.00 |
| Base - Ammonia (28%) | 2.66 |
| Coalescent (Texanol) | 12.47 |
| Water | 226.92 |

The resulting preformulated binder package should have a total volume of 100 gallons, a total weight of 857.59 lbs., a volume solids of 40.00%, a weight solids of 41.55%, a density of 8.5759 lbs./gal., and 3.50% coalescent on latex solids.

Example 58

This example describes a small particle size aggregate for use in giving the aggregate finish a fine texture.

| Ingredient | Amount (lbs./100 gal.) |
|---|---|
| Sand - Small Particle Size (Sand #90) | 2,211.18 |

The resulting preformulated aggregate package should have a total volume of 100 gallons, a total weight of 2,211.18 lbs., a volume solids of 100.00%, a weight solids of 100.00%, and a density of 22.1118 lbs./gal.

Example 59

This example describes the preparation of preformulated large particle size aggregate that gives coarse texture. It is prepared using a ribbon mixer.

| Ingredient | Amount (lbs./100 gal.) |
|---|---|
| Sand - Large Particle Size (Sand #15) | 442.24 |
| Sand - Small Particle Size (Sand #90) | 1768.94 |

The resulting preformulated aggregate should have a total volume of 100 gallons, a total weight of 2,211.18 lbs., a volume solids of 100.00%, a weight solids of 100.00%, and a density of 22.1118 lbs./gal.

Example 60

This example describes the preparation of 19 aggregate finish formulations of varying quality, color intensity, and texture. To make these different aggregate finishes different combinations of the small particle size extender preformulation of Example 55, the binder preformulations of Examples 56 and 57, the white pigment prepaint of Example 54, and the large particle size aggregate of Examples 58 and 59 are used at various ratios. The aggregate finishes are formulated by adding the small particle size extender preformulation to the binder preformulation and then adding the white pigment prepaint if needed, and finally adding the water and large particle size aggregate. The components are thoroughly mixed using a ribbon mixer. The amounts mixed are those shown below. All weights are in lbs., the total volume of each aggregate finish is 100 gallons, formulated to 67% volume solids.

Nineteen different aggregate finishes prepared using the preformulations of Examples 54 through 57, as well as mixtures of large particle size aggregate such as those in Examples 58 and 59.

| | Weight of Example Prepaints | | | | | | | |
|---|---|---|---|---|---|---|---|---|
| Paint | 55 | 56 | 57 | 58 | 59 | 54 | Water | Total |
| 60-1 | 64.72 | 429.09 | | 995.56 | | 0.00 | 10.03 | 1499.40 |
| 60-2 | 41.60 | 432.75 | | 995.56 | | 30.90 | 6.55 | 1507.11 |
| 60-3 | 6.93 | 438.24 | | 995.56 | | 77.26 | 1.34 | 1518.66 |
| 60-4 | 180.29 | 337.56 | | 995.56 | | 0.00 | 27.41 | 1540.82 |
| 60-5 | 157.17 | 341.22 | | 995.56 | | 30.90 | 23.93 | 1548.52 |
| 60-6 | 122.50 | 346.71 | | 995.56 | | 77.26 | 18.72 | 1560.08 |
| 60-7 | 295.86 | 246.03 | | 995.56 | | 0.00 | 44.79 | 1582.24 |
| 60-8 | 272.74 | 249.69 | | 995.56 | | 30.90 | 41.31 | 1589.94 |
| 60-9 | 238.07 | 255.18 | | 995.56 | | 77.26 | 36.10 | 1601.50 |
| 60-10 | 122.50 | | 340.08 | 995.56 | | 77.26 | 18.72 | 1553.45 |
| 60-11 | 64.72 | 429.09 | | | 995.56 | 0.00 | 10.03 | 1499.40 |
| 60-12 | 41.60 | 432.75 | | | 995.56 | 30.90 | 6.55 | 1507.11 |

-continued

| | Weight of Example Prepaints | | | | | | | |
|---|---|---|---|---|---|---|---|---|
| Paint | 55 | 56 | 57 | 58 | 59 | 54 | Water | Total |
| 60-13 | 6.93 | 438.24 | | | 995.56 | 77.26 | 1.34 | 1518.66 |
| 60-14 | 180.29 | 337.56 | | | 995.56 | 0.00 | 27.41 | 1540.82 |
| 60-15 | 157.17 | 341.22 | | | 995.56 | 30.90 | 23.93 | 1548.52 |
| 60-16 | 122.50 | 346.71 | | | 995.56 | 77.26 | 18.72 | 1560.08 |
| 60-17 | 295.86 | 246.03 | | | 995.56 | 0.00 | 44.79 | 1582.24 |
| 60-18 | 272.74 | 249.69 | | | 995.56 | 30.90 | 41.31 | 1589.94 |
| 60-19 | 238.07 | 255.18 | | | 995.56 | 77.26 | 36.10 | 1601.50 |

The PVC, TiO2 level, expected color intensity, texture, and low temperature flexibility of the resulting aggregate finish coating formulations shown below.

| Paint | PVC | TiO$_2$ PVC | Texture | Flex | Color tone | Quality |
|---|---|---|---|---|---|---|
| 60-1 | 70 | 0 | fine | 40° F. | deep | high |
| 60-2 | 70 | 1 | fine | 40° F. | mid-tone | high |
| 60-3 | 70 | 2.5 | fine | 40° F. | pastel | high |
| 60-4 | 75 | 0 | fine | 40° F. | deep | medium |
| 60-5 | 75 | 1 | fine | 40° F. | mid-tone | medium |
| 60-6 | 75 | 2.5 | fine | 40° F. | pastel | medium |
| 60-7 | 80 | 0 | fine | 40° F. | deep | low |
| 60-8 | 80 | 1 | fine | 40° F. | mid-tone | low |
| 60-9 | 80 | 2.5 | fine | 40° F. | pastel | low |
| 60-10 | 75 | 2.5 | fine | 0° F. | pastel | medium |
| 60-11 | 70 | 0 | coarse | 40° F. | deep | high |
| 60-12 | 70 | 1 | coarse | 40° F. | mid-tone | high |
| 60-13 | 70 | 2.5 | coarse | 40° F. | pastel | high |
| 60-14 | 75 | 0 | coarse | 40° F. | deep | medium |
| 60-15 | 75 | 1 | coarse | 40° F. | mid-tone | medium |
| 60-16 | 75 | 2.5 | coarse | 40° F. | pastel | medium |
| 60-17 | 80 | 0 | coarse | 40° F. | deep | low |
| 60-18 | 80 | 1 | coarse | 40° F. | mid-tone | low |
| 60-19 | 80 | 2.5 | coarse | 40° F. | pastel | low |

The aggregate finish coatings shown above represent a range of qualities, textures, and coloring abilities that depend upon the PVC, TiO$_2$ level, and particle size ratio of the large particle size extender. These formulations are not intended to be limited by the example. For instance, all the extender prepaints/preformulation could be formulated without binder. In addition, the extender prepaint/preformulation is not meant to limited to the use of nepheline syenite, but to show an example that includes other commonly used extenders such as, clays, silicas, magnesium silicates, calcium carbonates, etc. The TiO$_2$ slurry can be added to the extender prepaint/preformulation.

Example 61

The following prepaints should provide a range of coatings for wood, including coatings that contain an opacifying pigment ("pigmented coatings") and coatings that do not contain an opacifying pigment or extenders on a pigment ("clear coatings"):

Binder Prepaint 1 is made by adding 7979 g of Rhoplex CL-104 binder to a vessel. With good agitation, 800 g of ethylene glycol monobutyl ether, 240 g of dipropylene glycol monobutyl ether, and 1800 g of water are then added.

Binder Prepaint 2 is made by adding 6636 g of Rhoplex CL-105 binder to a vessel. With good agitation, 800 g of ethylene glycol monobutyl ether, 240 g of dipropylene glycol monobutyl ether and 1800 g of water are then added.

Binder Prepaint 3 is made by adding 760 g of RoShield 3188 binder to a vessel. With good agitation, 400 g of ethylene glycol monobutyl ether, 120 g of dipropylene glycol monobutyl ether, 900 g of water, and 100 g of Paraplex™ WP-1 poly(propylene oxide), monocresyl ether (Rohm and Haas Company, Philadelphia, Pa.) are then added.

Additive Prepaint 1 is made by blending, under agitation, 70 g of Tego Foamex 805 defoamer, 30 g of Tego Glide™ 410 (50% in Dowanol DPM solvent) wax (Tego Chemie Service), 30 g of Surfynol™ 104DPM surfactant, 25 g of Acrysol™ RM-825 HASE thickener, and 200 g of Michem Emulsion 39235.

Titanium dioxide prepaint is made in a Cowles mixer as follows:

| Grind | Weight (pounds) | Volume (gallons) |
|---|---|---|
| Water | 282.96 | 33.90 |
| Tamol 731 ™ dispersant | 58.51 | 6.35 |
| Triton ™ CF-10 surfactant | 2.19 | 0.25 |
| Kathon ™ LX 1.5% biocide | 2.19 | 0.26 |
| Ti-Pure ™ R-706 titanium dioxide | 1462.80 | 43.81 |
| Letdown | | |
| Ammonia (28%) | 0.66 | 0.09 |
| Acrysol ™ RM-2020 NPR HEUR thickener | 54.76 | 6.29 |
| Totals | 1939.64 | 100.00 |

| All quantities in grams | General Purpose Topcoats-for Wood | | | | | Solvent Resistant-Topcoats for Wood | | | | | Coatings for Board | | | | Thermoset Coating |
|---|---|---|---|---|---|---|---|---|---|---|---|---|---|---|---|
| | A gloss | B flatted | C DIY gloss | D DIY flatted | E white gloss | F gloss | G flatted | H DIY gloss | I DIY flatted | J white gloss | K gloss | L flatted | M wiping stain | N exterior high build stain | O white |
| Binder Prepaint 1 | 10,810 | 10,810 | 10,810 | 10,810 | 7000 | — | — | — | — | — | — | — | — | — | — |
| Binder Prepaint 2 | — | — | — | — | — | — | — | — | — | — | 9476 | 9476 | 6120 | 6120 | — |
| Binder Prepaint 3 | — | — | — | — | — | 9200 | 9200 | 9200 | 9200 | 6550 | — | — | — | — | — |
| Binder Rhoplex AC-1024 | — | — | — | — | — | — | — | — | — | — | — | — | — | — | 3945 |
| Additive Prepaint 1 | 896 | 896 | 800 | 800 | 258 | 800 | 800 | 800 | 800 | 258 | 200 | 200 | — | — | 1700 |
| TiO₂ Prepaint | — | — | — | 1520 | — | — | — | — | 1520 | — | — | — | — | — | 1192 |
| Flatting Agent Syloid ™ 7000 | — | 120 | — | 120 | — | — | 120 | — | 120 | — | — | 120 | — | — | — |
| Predispersed Pigment Aquasperse Burnt Umber 877-1314 | — | — | — | — | — | — | — | — | — | — | — | — | 772 | 772 | — |
| Coalescent Propylene Glycol | — | — | — | — | — | — | — | — | — | — | — | — | 258 | 258 | — |
| Water | — | — | — | — | — | — | — | — | — | — | — | — | 2573 | 2573 | 983 |
| Coalescent Hexyl Carbitol | — | — | 400 | 400 | — | — | — | 300 | 300 | — | — | — | — | — | — |
| Thickener Acrysol ™ RM-2020 NPR | — | — | 180 | 180 | — | — | — | 120 | 120 | — | — | — | 86 | 160 | — |

AC-1024, White, Thermoset Formulation - used with urea formaldehyde resin at 1973 g on total formulation
These formulations can also be used as pigmented and clears on hardboard, MDF, plywood, oriented strand board.

Example 62

The following prepaints are prepared and used for formulating a range of coatings for metal substrates that would typical for maintenance or original equipment manufacturing applications:

| Ingredient | Prepaint Formulas (pounds/100 gallons) | | | | |
|---|---|---|---|---|---|
| | TiO₂ Prepaint | Extender Prepaint 1 | Extender Prepaint 2 | Extender Prepaint 3 | Binder Prepaint |
| Dowanol ™ DPM ester solvent | 116.9 | 79.15 | 98.0 | 82.2 | — |
| Water | 227.3 | 302.8 | 190.1 | 314.3 | — |
| Tamol ™ 165A dispersant | 64.95 | 43.97 | 54.19 | 45.64 | — |
| Triton ™ CF-10 surfactant | 6.5 | 4.4 | 5.5 | 4.6 | — |
| Tegofoamex ™ 1488 defoamer | 9.7 | 6.6 | 8.3 | 6.9 | — |
| Ti-Pure ™ R-706 TiO₂ | 1266.4 | — | — | — | — |
| 2610 Lo Micron ™ talc | — | 857.5 | — | — | — |
| Albaglos ™ CaCO₃ | — | — | 1062.6 | — | — |
| Halox ™ SZP-391 reactive pigment (Halox, Inc., Hammond, | — | — | — | 889.9 | — |

-continued

Prepaint Formulas
(pounds/100 gallons)

| Ingredient | TiO$_2$ Prepaint | Extender Prepaint 1 | Extender Prepaint 2 | Extender Prepaint 3 | Binder Prepaint |
|---|---|---|---|---|---|
| IN) | | | | | |
| Ammonia 15% | 2.8 | 1.9 | 2.4 | 1.9 | — |
| Water | 32.5 | 21.9 | 27.5 | 22.8 | 31.45 |
| Kathon ™ LX biocide | 2.1 | 1.4 | 1.6 | 1.5 | — |
| Acrysol ™ RM-2020 NPR HEUR thickener | 56.1 | 56.1 | 56.1 | — | — |
| Natrasol ™ 250 GR (4%) HEC thickener | — | — | — | 58.3 | — |
| Maincote ™ HG-54D binder | — | — | — | — | 754.8 |
| Texanol ™ coalescent | — | — | — | — | 47.17 |
| 15% sodium nitrite | — | — | — | — | 10.48 |
| Ammonia 15% | — | — | — | — | 5.24 |
| Acrysol ™ RM-8W HASE thickener | — | — | — | — | 2.62 | pH = ~8.5–9
Viscosity 90–110 KU
Hegmen grinds in the range specific for that grade of pigment.

The above prepaints may be combined to form the following range of coatings for metals:

| Product Components | High PVC white Primer % by weight | Gloss white % by weight | Low gloss white % by weight | Low gloss Clear Top % by weight | Clear Topcoat % by weight |
|---|---|---|---|---|---|
| TiO$_2$ Prepaint | 10.1 | 13 | 12.5 | — | — |
| Extender Prepaint 1 | 5.4 | — | — | — | — |
| Extender Prepaint 2 | 6.1 | — | 4.2 | 2.9 | — |
| Extender Prepaint 3 | 10.8 | — | — | — | — |
| Binder Prepaint | 57.6 | 87 | 83.3 | 97.1 | 100 |
| PVC | 31.89 | 17.82 | 13.98 | 3.37 | — |
| Solids - volume | 34.67 | 35.56 | 35.41 | 35.19 | 35.02 |
| Solids - weight | 48.31 | 46.01 | 44.96 | 38.71 | 36.78 |

Example 63

A line of graphic art inks can be produced from a limited set of blended raw materials ("preinks" or "prepaints"). The prepaints are prepared as follow:

Prepaint 1 ("Hard Binder Prepaint") is prepared by adding 94 parts of Lucidene 370 polymer (Rolrn and Haas Company) to a vessel. With good agitation 5 parts of Luciwax 37 wax (Rohm and Haas Company) and 1 part of a defoamer are added.

Prepaint 2 ("Mid Tg Binder Prepaint") is prepared by adding 94 parts Lucidene 615 polymer (Rohm and Haas Company) to a vessel. With good agitation 5 parts of Luciwax 37 wax (Rohm and Haas Company) and 1 part of a defoamer are added.

Prepaint 3 ("Soft Binder Prepaint") is prepared by adding 89 parts of Lucidene 605 polymer (Rohm and Haas Company) to a vessel. With good agitation 5 parts of Luciwax 37 wax (Rohm and Haas Co), 1 part of a defoamer, and 5 parts isopropyl alcohol are added.

Prepaint 4 ("Alkali Soluble Resin Additive Prepaint") is Morcryl 132 resin (Rohm and Haas Company), used as supplied at 32% solids and pH 8.5

Prepaint 5 ("Gloss Additive Prepaint") is Morcryl 350 resin (Rohm and Haas Company) used as supplied at 50% solids and pH 9.0.

Prepaint 6 ("Wax Additive Prepaint") is a Michem Lube 743 wax (Michelman, Inc.) used as supplied at 32% solids and pH 7.

Color is added to the inks using pigment dispersions, such as SunFlexiverse Dispersion (Sun Chemical Co) supplied at about 40% solids, in a plurality of colors.

The line of graphic arts inks is described in the table below. Each product is prepared by blending the indicated materials (as weight in grams) with good agitation. The final viscosity is adjusted as desired with additional water and or isopropyl alcohol. Where a range of materials to blend is indicated, a range of properties in the fmal product can be obtained. For example, using the highest level of Prepaint 3 in the ink for freezer bags will result in better low temperature crinkle resistance. Using the higher level of Prepaint 4 in most inks will result in better transfer on the printing press.

| Ink Product | Binder Prepaint 1 | Binder Prepaint 2 | Binder Prepaint 3 | Additive Prepaint 4 | Additive Prepaint 5 | Additive Prepaint 6 | Pigment Dispersion |
|---|---|---|---|---|---|---|---|
| Giftwrap Paper | 55–65 | — | — | 10–20 | — | — | 25–30 |
| Corrugated Box | 55–65 | — | — | 10–20 | — | 4–6 | 25–30 |
| Newsprint | 65–75 | — | — | — | — | — | 30 |
| Paperboard | 55–65 | — | — | — | 10–20 | — | 25–30 |
| Labels | 28–33 | 28–33 | — | 10–20 | — | — | 25–30 |

-continued

| | | | | | | |
|---|---|---|---|---|---|---|
| Freezer Bags | — | — | 55–65 | 10–20 | — | — | 25–30 |
| Store Bags | — | — | 55–65 | — | 10–20 | — | 25–30 |
| Metal Film | — | 28–33 | 28–33 | — | — | — | 25 |
| Foil | — | 28–33 | 28–33 | — | 10–20 | — | 25–30 |
| General Purpose Overprint | — | 80 | — | 15–25 | — | — | — |
| High Gloss Overprint | 35–45 | — | 35–45 | — | 20 | — | — |
| Water Resistant Overprint | — | 35–45 | 35–45 | 10–20 | — | — | — |
| Rub Resistant Overprint | — | 75–85 | — | 20 | — | 4–6 | — |
| High Slip Angle Overprint | — | 80 | — | 15–25 | — | — | — |

Supplier Information

| Material Name | Material Type | Supplier |
|---|---|---|
| Tamol ™ 1124 | Dispersant | Rohm and Haas Company (Philadelphia, PA) |
| Tamol ™ 1254 | Dispersant | Rohm and Haas Company (Philadelphia, PA) |
| Tamol ™ 731 | Dispersant | Rohm and Haas Company (Philadelphia, PA) |
| Acrysol ™ DR-3 | HASE Thickener/Rheology Modifier | Rohm and Haas Company (Philadelphia, PA) |
| Acrysol ™ RM-2020 NPR | HEUR Thickener/Rheology Modifier | Rohm and Haas Company (Philadelphia, PA) |
| Acrysol ™ RM-8W | HEUR Thickener/Rheology Modifier | Rohm and Haas Company (Philadelphia, PA) |
| Acrysol ™ RM-825 | HEUR Thickener/Rheology Modifier | Rohm and Haas Company (Philadelphia, PA) |
| Rhoplex ™ Multilobe 200 | Emulsion Polymer Binder | Rohm and Haas Company (Philadelphia, PA) |
| Rhoplex ™ SG-10M | Emulsion Polymer Binder | Rohm and Haas Company (Philadelphia, PA) |
| RES 3083 | Emulsion Polymer Binder | Rohm and Haas Company (Philadelphia, PA) |
| Kathon ™ LX 1.5% | Biocide | Rohm and Haas Company (Philadelphia, PA) |
| Triton ™ CF-10 | Surfactant | Union Carbide Corporation (Danbury, CT) |
| Foamaster ™ VL | Defoamer | Henkel Corporation (King of Prussia, PA) |
| Drewplus ™ L-475 | Defoamer | Drew Chemical Corporation (Keamy, NJ) |
| Ti-Pure ™ R-746 | Titanium Dioxide | E.I. Dupont de Nemours and Co., Inc. (Wilmington, DE) |
| Ti-Pure ™ R-706 | Titanium Dioxide | E.I. Dupont de Nemours and Co., Inc. (Wilmington, DE) |
| Ti-Pure ™ R-900 | Titanium Dioxide | E.I. Dupont de Nemours and Co., Inc. (Wilmington, DE) |
| Ti-Pure ™ R-902 | Titanium Dioxide | E.I. Dupont de Nemours and Co., Inc. (Wilmington, DE) |
| Minex ™ 4 | Mineral Extender | Inimin Corp. (Dividing Creek, NJ) |
| Optiwhite ™ | Clay Extender | Burgess Pigment (Sandersville, GA) |
| Snowflake ™ | Calcium Carbonate Extender | ECC International Imerya (Sylacauga, AL) |
| Vicron ™ 15-15 | Calcium Carbonate Extender | Pfizer (New York, NY) |
| Omyacarb ™ | Calcium Carbonate Extender | Omya (Proctor, VI) |
| Texanol ™ | Coalescent | Eastman Chemical (Kings Port, TN) |

What is claimed:

1. A set of different, but mutually compatible fluid prepaints, sufficient to form at least one paint line, which set comprises:
   (i) at least one opacifying prepaint comprising at least one opacifying pigment;
   (ii) at least one extender prepaint comprising at least one extender pigment; and
   (iii) at least one binder prepaint comprising at least one latex polymeric binder.

2. The set of prepaints of claim 1, wherein the number of prepaints is from 3 to 15.

3. The set of prepaints of claim 1, wherein the opacifying prepaint further comprises at least one particulate polymeric binder adsorbed onto the opacifying pigment.

4. The set of prepaints of claim 1, wherein the extender prepaint further comprises at least one particulate polymeric binder absorbed onto the extender pigment.

5. A method of forming at least one paint line, comprising the steps of:
   (a) providing a set of different, but mutually compatible, fluid prepaints, comprising:
      (i) at least one opacifying prepaint, comprising at least one opacifying pigment;

ii) at least one extender prepaint comprising at least one extender pigment; and (iii) at least one binder prepaint comprising at least one latex polymeric binder; and (b) dispensing a predetermined amount of each of the prepaints into containers or applicator(s) to form the paint line.

6. A method of forming a range of paints, the range comprising at least two paint lines, which method comprises the steps of:

(a) providing a set of different, but mutually compatible, fluid prepaints sufficient to formulate at least two paint lines, which set comprises:
  (i) at least one opacifying prepaint comprising at least one opacifying pigment;
  (ii) at least one extender prepaint comprising at least one extender pigment;
  (iii) at least one binder prepaint comprising at least one latex polymeric binder; and
  (iv) at least one additional, different opacifying, extender, or binder prepaint selected from the group consisting of (i), (ii), and (iii); and (b) dispensing a predetermined amount of each of the prepaints into containers or applicator(s) to form the range of paints.

7. The method of claim 5, further comprising the step of mixing the prepaint before, while, or after they are dispensed into the containers.

8. The method of claim 5, further comprising the step of mixing the prepaint before or while they are dispensed into the applicator(s).

9. The method of claim 5, further comprising the step of adjusting the viscosity of the prepaints before, while, or after they are into the containers.

10. The method of claim 5, further comprising the step of adjusting the viscosity of the dispensed prepaints before or while they are dispensed into the applicator(s).

11. The method of claim 5, further comprising the step of adding at least one additive that enhances application or final performance of the paint.

12. The method of claim 11, wherein the additive is on aggregate material.

13. The method of claim 11, wherein the additive is a thickener.

14. The method of claim 5, further comprising the step of adding at least one colorant to the prepaints.

15. The method of claim 5, wherein the opacifying prepaint further comprises at least one particulate polymeric binder absorbed onto the opacifying pigment.

16. The method of claim 5, wherein the extender prepaint further comprises at least one particulate polymeric binder absorbed onto the extender pigment.

17. The method of claim 5, wherein the method is carried out at a paint manufacturing facility.

18. The method of claim 5, wherein the number of prepaints is from 4 to 15.

19. A fluid opacifying prepaint useful for formulating a one pack, pigmented latex paint having a volume solids content of about 30% to about 70% and a Stormer viscosity of about 50 to about 250 KU, which prepaint contains other paint ingredients, which prepaint consists essentially of:

(i) at least one opacifying pigment,
(ii) at least one dispersant,
(iii) at least one thickener, and
(iv) water;
wherein the dispersant(s) and the thickener(s) are mutually compatible with the pigment(s) and with the other paint ingredients.

20. The prepaint of claim 19, wherein the volume solids content is about 35% to about 50% and the Stormer viscosity is about 60 to about 150 KU.

21. A fluid white opacifying prepaint having a volume solids content of about 30% to about 70%, a PVC of about 35% to about 100%, and a Stormer viscosity of about 50 to about 250 KU, useful for formulating a one pack, pigmented latex paint containing other paint ingredients, which prepaint consists essentially of:

(i) at least one opacifying pigment,
(ii) at least one dispersant,
(iii) at least one thickener,
(iv) at least one film-forming or non-film-forming polymer, and
(v) water; wherein the dispersant(s), the thickener(s), and the polymer(s) are compatible with the pigment(s) and with the other paint ingredients and wherein the prepaint is stable to sedimentation.

22. The prepaint of claim 21, wherein the volume solids content is about 35% to about 50%, the PVC is about 50 to about 100%, and the Stormer viscosity is about 60 to about 150 KU.

23. The prepaint of claim 21, wherein the polymer is adsorbed onto the opacifying pigment.

24. The prepaint of claim 19 or 21, wherein the opacifying pigment is a material selected from the group consisting of titanium dioxide, zinc oxide, lead oxide, a synthetic polymer pigment, and mixtures thereof.

25. The prepaint of claim 19 or 21, wherein the opacifying pigment is rutile titanium dioxide.

26. The prepaint of claim 24, wherein the synthetic polymer pigment is voided latex polymer particles.

27. The prepaint of claim 19 or 21, wherein the dispersant is a selected from the group consisting of 2-amino-2-methyl-1-propanol; dimethylaminoethanol; potassium tripolyphosphate; trisodium polyphosphate; citric acid; polyacrylic acid; diolefin/maleic anhydride adducts; hydrophobically-modified polyacrylic acid, hydrophilically-modified polyacrylic acid, and salts thereof; and mixtures thereof.

28. The prepaint of claim 19 or 21, wherein the thickener is a selected from the group consisting of an alkali-soluble or alkali-swellable emulstion (ASE), a hydrophobically-modified, alkali-soluble emulstion (HASE), a hydrophobically-modified ethylene oxide-urethane polymer (HEUR), a cellulosic, a hydrophobically-modified cellulosic, a hydrophobically-modified polyacrylamide, a polyvinyl alcohol, a fumed silica, an attapulgite clay, a titanate chelating agent, and mixtures thereof.

29. The prepaint of claim 21, wherein the polymer is selected from the group consisting of acrylic, polyvinyl acetate, styrene-acrylic, styrene-butadiene, vinyl acetate-acrylic, ethylene-vinyl acetate, vinyl acetate-vinyl versatate, vinyl acetate-vinyl maleate, vinyl acetate-vinyl chloride-acrylic, ethylene-vinyl acetate-acrylic polymers and mixtures thereof and wherein the polymer further comprises up to about 10% by weight of the polymer of a monomer selected from the group consisting of a functional monomer, a co-monomer, and combinations thereof.

30. The prepaint of claim 19 or 21, further consisting essentially of at least one additive selected from the group consisting of an acid, a base, a defoamer, a coalescent, a cosolvent, a mildewcide, a biocide, and an antifreeze agent, with the additive being present in an amount of less than about 10% by weight, based on the total weight of the prepaint.

31. A fluid pigment extender prepaint, useful for formulating a one pack, pigmented latex paint containing other paint ingredients, which prepaint consists essentially of (i) at least one mineral extender having a volume solids content of about 30% to about 70%, a PVC of about 35% to about 100%, and a Stormer viscosity of about 50 to about 250 KU;

(ii) at least one thickener, (iii) water, and (iv) an optional polymeric binder; wherein the prepaint ingredients are compatible with each other and with the ingredients of the paint.

32. A set of two different, but mutually compatible binder prepaints useful for formulating a latex paint, which set comprises:

(a) the opacifying prepaint of claim 19 or 21; and (b) a latex polymeric binder prepaint having volume solids content of about 25% to about 70% or a Brookfield viscosity of less than about 100,000 centipoise at a shear rate of 1.25 reciprocal seconds, which prepaint consists essentially of a water-borne latex polymeric binder having a Tg of about −430° C. to about 70° C. and water;

wherein the prepaint ingredients are mutually compatible with each other and with the ingredients of the other prepaint in the set.

33. The set of prepaints of claim 32, wherein the binder prepaint has a volume solids content of about 30 to about 65% and a Brookfield viscosity of about 100 to about 50,000 centipoise at a shear rate of 1.25 reciprocal seconds, and consists essentially of a water-borne polymeric binder having a Tg of about −10 to about 60° C.

34. The set of prepaints of claim 32, wherein the binder prepaint further consists essentially of at least one additive selected from the group consisting of an acid, a base, a defoamer, a coalescent, a cosolvent, a mildewcide, a biocide, and antifreeze agent, the additive being present in an amount of less than about 10% by weight, based on the total weight of the prepaint.

35. A set of three different, but mutually compatible, fluid prepaints, useful for formulating a latex paint, which set comprises:

(a) the set of prepaints of claim 32 wherein the extender prepaint has a volume solids content of about 30% to about 70%, a PVC of about 35% to about 100%, and a Stormer viscosity of about 50 to about 250 KU; and (b) a fluid pigment extender prepaint which consists essentially of:

(i) at least one mineral extender, (ii) at least one thickener, (iii) water, and (iv) optionally a polymeric binder.

36. The set of prepaints of claim 35, wherein the extender prepaint has a volume solids content of about 35% to about 65%, a PVC of about 40% to about 100% and a Stormer viscosity of about 60 to about 150 KU.

37. The set of prepaints of claim 32, wherein the extender prepaint further consists essentially of at least one additive selected from the group consisting of an acid, a base, a defoamer, a coalescent, a cosolvent, a mildewcide, a biocide and an antifreeze agent with the additive being present in an amount of less than about 20% by weight, based on the total weight of prepaint.

38. A paint line produced by a process which comprises the steps of:

a. providing a set of different, but mutually compatible, fluid prepaints, which set comprises:

(i) at least one opacifying prepaint comprising at least one opacifying pigment, (ii) at least one extender prepaint comprising at least one extender pigment, and (iii) at least one binder prepaint comprising at least one latex polymeric binder; and b. dispensing a predetermined amount of each of the prepaints into containers or applicators to form the paint line.

39. A set of different, but mutually compatible, fluid prepaints, sufficient to form at least one paint line useful as an elastomeric coating, which set comprises:

(i) at least one opacifying prepaint comprising at least one opacifying pigment;

(ii) at least one extender prepaint comprising at least one extender pigment; and (iii) at least one binder prepaint comprising at least one latex polymeric binder having a Tg of less than about 0° C.

40. A method of forming at least one paint line useful as an elastomeric coating, which method comprises the steps of:

(a) providing a set of different, but mutually compatible, fluid prepaints, which set comprises:

(i) at least one opacifying prepaint comprising at least one opacifying pigment;

(ii) at least one extender prepaint comprising at least one extender pigment; and (iii) at least one binder prepaint comprising at least one latex polymer binder having a Tg of less than about 0° C.; and (b) dispensing a predetermined amount of each of the prepaints into containers or applicators to form the paint line.

41. A method of forming a range of paints, the range comprising at least two paint lines useful as an elastomeric coating, which method comprises the steps of:

(a) providing a set of prepaints sufficient to formulate at least two paint lines, which set comprises:

(i) at least one opacifying prepaint comprising at least one opacifying pigment;

(ii) at least one extender prepaint comprising at least one extender pigment;

(iii) at least one binder prepaint comprising at least one latex polymeric binder having a Tg of less than about 0° C.; and (iv) at least one additional different prepaint selected from the group consisting of (i), (ii), (iii), and (iv); and (b) dispensing a predetermined amount each of the prepaints into containers or applicators to form the range of paints.

42. A set of different, but mutually compatible, fluid prepaints sufficient to form at least one paint line useful as a non-cementitious, aggregate finish, which set comprises:

(i) at least one opacifying prepaint comprising at least one opacifying pigment;

(ii) at least one extender prepaint comprising at least one extender pigment;

(iii) at least one binder prepaint comprising at least one latex polymeric binder; and (iv) at least one prepaint comprising an aggregate.

43. A method of forming at least one paint line useful as a non-cementitious, aggregate finish, which method comprises the steps of:

(a) providing a set of different, but mutually compatible, fluid non-cementitious prepaints, which set comprises:

(i) at least one opacifying prepaint comprising at least one opacifying pigment;
(ii) at least one extender prepaint comprising at least one extender pigment;
(iii) at least one binder prepaint comprising at least one latex polymeric binder; and
(iv) at least one prepaint comprising an aggregate; and
(b) dispensing a predetermined amount of each of the prepaints into containers or applicators to form the paint line.

44. A method of forming a range of paints, the range comprising at least two paint lines useful as a non-cementitious, aggregate finishing coating, which method comprises the steps of:
(a) providing a set of different fluid, but mutually compatible, non-cementitious prepaints sufficient to formulate at least two paint lines, which set comprises
(i) at least one opacifying prepaint comprising at least one opacifying pigment;
(ii) at least one extender prepaint comprising at least one extender pigment,
(iii) at least one binder prepaint comprising at least one latex polymeric binder,
(iv) at least one prepaint comprising an aggregate, and
(v) at least one additional different, prepaint selected from the group consisting of (i), (ii), (iii), and (iv); and
(b) dispensing a predetermined amount of each of the prepaints into containers or applicators to form the range of paints.

45. A set of different, but mutually compatible, fluid prepaints sufficient to formulate at least one paint line useful for forming pigmented and clear coatings, which set comprises:
(i) at least one prepaint comprising at least one opacifying pigment; and
(ii) at least two prepaints each of which comprises at least one latex polymeric binder.

46. A set of different, but mutually compatible, fluid prepaints sufficient to form at least one paint line useful in graphics art applications, which set comprises:
(i) at least one prepaint comprising at least one latex polymeric binder having a Tg of about −50° C. to about 10° C.;
(ii) at least one prepaint comprising at least one latex polymeric binder having a Tg of about 50 to about 140° C.; and
(iii) optionally, at least one prepaint comprising at least one latex polymeric binder having a Tg of about 0° C. to about 65° C.

47. The set of prepaints of claim 46, which further comprises at least one additional prepaint selected from the group consisting of a prepaint comprising at least one alkali-soluble resin, a prepaint comprising at least one gloss additive, a prepaint comprising at least one wax, and at least one prepaint comprising at least one pigment dispersion.

48. A method of forming at least one paint line, which method comprises the steps of:
(a) providing the set of prepaints of claim 45, 46 or 47; and
(b) dispensing a predetermined amount of each of the prepaints into containers or applicators to form the paint line.

49. The set of prepaints of claim 1 wherein the extender prepaint has a PVC of about 35% to about 100%.

50. The method of forming at least one paint line of claim 5 wherein the extender prepaint has a PVC of about 35% to about 100%.

* * * * *

(12) INTER PARTES REEXAMINATION CERTIFICATE (0095th)
United States Patent
Friel et al.

(10) Number: US 6,531,537 C1
(45) Certificate Issued: Aug. 25, 2009

(54) PREPAINTS AND METHODS OF PREPARING PAINTS FROM THE PREPAINTS

(75) Inventors: John Michael Friel, Warminster, PA (US); John William Hook, III, Warminster, PA (US); Bernhard Helmut Lieser, San Pedro, CA (US); Jerry William Washel, Harleysville, PA (US); Dennis Paul Lorah, Lansdale, PA (US); Joseph Michael Beno, Jr., New Hope, PA (US); Irene May Melly, Oreland, PA (US)

(73) Assignee: Rohm and Haas Company, Philadelphia, PA (US)

Reexamination Request:
No. 95/000,068, Dec. 27, 2004

Reexamination Certificate for:
Patent No.: 6,531,537
Issued: Mar. 11, 2003
Appl. No.: 09/785,152
Filed: Feb. 16, 2001

Related U.S. Application Data

(60) Provisional application No. 60/183,655, filed on Feb. 18, 2000, provisional application No. 60/183,656, filed on Feb. 18, 2000, and provisional application No. 60/247,639, filed on Nov. 10, 2000.

(51) Int. Cl.
| | | |
|---|---|---|
| *B01F 13/00* | (2006.01) | |
| *B01F 13/10* | (2006.01) | |
| *B01F 15/00* | (2006.01) | |
| *B44D 3/06* | (2006.01) | |
| *B44D 3/00* | (2006.01) | |
| *B44D 2/00* | (2006.01) | |
| *B44D 3/08* | (2006.01) | |
| *C09D 17/00* | (2006.01) | |
| *C09D 7/12* | (2006.01) | |
| *C09D 7/14* | (2006.01) | |

(52) U.S. Cl. .......... 524/497; 524/247; 524/284; 524/417; 524/430; 524/432; 524/445; 524/493

(58) Field of Classification Search .......... 523/205, 523/200; 524/425, 430, 432, 445, 493, 497
See application file for complete search history.

(56) References Cited

U.S. PATENT DOCUMENTS

| 3,758,432 A | * | 9/1973 | Hopper ............... 524/198 |
|---|---|---|---|
| 3,956,206 A | | 5/1976 | Sellars et al. |
| 4,243,430 A | | 1/1981 | Sperry et al. |
| D262,628 S | | 1/1982 | Meyer |
| 4,373,390 A | | 2/1983 | van Dyke et al. |
| 4,401,787 A | * | 8/1983 | Chen ............... 524/603 |
| 4,403,866 A | | 9/1983 | Falcoff et al. |
| 4,436,845 A | | 3/1984 | Kitano |
| 4,705,082 A | | 11/1987 | Fanshawe et al. |
| 4,880,842 A | | 11/1989 | Kowalski et al. |

(Continued)

FOREIGN PATENT DOCUMENTS

| CA | 935255 | | 10/1973 |
|---|---|---|---|
| CA | 2166290 | | 11/1995 |
| EP | 287144 A1 | * | 10/1988 |
| IT | 00150130417 | | 2/1998 |

OTHER PUBLICATIONS

Steward "Preparation of Surfactant–Free Poly (Butyl Methacrylate) Polymer Latex" (1995).*

(Continued)

*Primary Examiner*—Alan Diamond

(57) ABSTRACT

Methods of providing a paint line containing a latex polymeric binder are described. A range of paints can be formulated using sets of prepaints, at least one of which contains a latex polymeric binder. The paints may be applied as architectural coatings, industrial coatings, graphic arts coating, elastomeric coatings, and non-cementitious, aggregate finish coatings suitable for application on a wall directly or as a topcoat in exterior insulation finishing systems.

U.S. PATENT DOCUMENTS

| | | | | |
|---|---|---|---|---|
| 4,912,154 | A | * | 3/1990 | Arora et al. ................. 524/840 |
| 4,967,938 | A | | 11/1990 | Hellenberg |
| D327,895 | S | | 7/1992 | Edstrom |
| 5,167,705 | A | * | 12/1992 | Coughlan .................... 106/36 |
| 5,268,849 | A | | 12/1993 | Howlett et al. |
| 5,322,884 | A | * | 6/1994 | Wellman et al. ............ 524/601 |
| D349,506 | S | | 8/1994 | Caruso et al. |
| 5,445,195 | A | | 8/1995 | Kim |
| 5,521,234 | A | | 5/1996 | Brown et al. |
| 5,527,853 | A | | 6/1996 | Landy et al. |
| 5,643,669 | A | | 7/1997 | Tsuei |
| 5,672,649 | A | | 9/1997 | Brock et al. |
| 5,773,752 | A | | 6/1998 | Blume et al. |
| 5,851,541 | A | * | 12/1998 | Corey et al. ................. 424/401 |
| 5,877,234 | A | | 3/1999 | Xu et al. |
| 5,989,331 | A | | 11/1999 | Bauer et al. |
| 6,074,474 | A | * | 6/2000 | Broome et al. .............. 106/486 |
| 6,221,145 | B1 | | 4/2001 | McClain |
| 6,420,474 | B1 | * | 7/2002 | Carey et al. ................. 524/501 |

OTHER PUBLICATIONS

Paint Production by Component Mixing, Grundfelt–Forsius, et al., 1997.

Acid–Base Interactions to Vinyl Chloride Polymers, John Wiley & Sons, Encyclopedia of Polymer Science and Engineering, 1989.

Any Kind of Paint You Like, Innovation & Technology Transfer, Jul. 2000.

English abstract for JP 59–172559, Oct. 1998.

Anton Helander, The Finnish Journal of Business Economics, Impact of form Postponement on Channel Members' Performance in Pint Business: A Theoretical Approach, 3/99 pp. 225–237.

Anton Helander, Benefits of Delayed Product Differentiation, Feb. 1999.

Carola Grundfelt–Forsius, Paint Production by Component Mixing, 1997, pp. 1–4.

Computers Chemical Engineering, Scheduling Of Batch Processes: An Industrial Application In Paint Industry, 1997, Supplement pp. S673–S678.

Manufacturing Technology, Component Mixing—A New Approach to Customized Paint Production, 2000, pp. 156 & 157.

* cited by examiner

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–50 are cancelled.

* * * * *